United States Patent
Hashimoto et al.

(10) Patent No.: US 6,920,954 B2
(45) Date of Patent: Jul. 26, 2005

(54) PEDESTRIAN PROTECTION AIRBAG SYSTEM

(75) Inventors: Masakazu Hashimoto, Aichi (JP); Yuji Sato, Aichi (JP); Toru Koyama, Aichi (JP)

(73) Assignee: Toyoda Gosei Co. Ltd., Aichi-ken (JP)

( * ) Notice: Subject to any disclaimer, the term of this patent is extended or adjusted under 35 U.S.C. 154(b) by 146 days.

(21) Appl. No.: 10/648,267

(22) Filed: Aug. 27, 2003

(65) Prior Publication Data

US 2004/0074688 A1 Apr. 22, 2004

(30) Foreign Application Priority Data

Aug. 30, 2002 (JP) .................................... P2002-255277

(51) Int. Cl.[7] .............................................. B60R 21/34
(52) U.S. Cl. ...................... 180/274; 280/735; 280/748
(58) Field of Search ................................ 180/271, 274, 180/282; 280/730.1, 735, 748; 296/187.04; B60R 21/34

(56) References Cited

U.S. PATENT DOCUMENTS

| | | | | |
|---|---|---|---|---|
| 5,897,135 A | * | 4/1999 | Oehm ..................... | 280/728.3 |
| 6,474,679 B2 | * | 11/2002 | Miyasaka et al. ........ | 280/730.1 |
| 6,637,788 B1 | * | 10/2003 | Zollner et al. .............. | 293/107 |
| 6,755,273 B2 | * | 6/2004 | Breed ........................ | 180/274 |
| 6,851,504 B2 | * | 2/2005 | Campbell et al. ........... | 180/271 |
| 6,857,495 B2 | * | 2/2005 | Sawa .......................... | 180/274 |
| 2002/0014761 A1 | * | 2/2002 | Miyasaka et al. ......... | 280/730.1 |

FOREIGN PATENT DOCUMENTS

| | | | | |
|---|---|---|---|---|
| DE | 19935342 A1 | * | 2/2001 | .......... B60R/21/34 |
| EP | 1004481 A2 | * | 5/2000 | .......... B60R/21/20 |
| EP | 1024063 A2 | * | 8/2000 | .......... B60R/21/34 |
| GB | 2368562 A | * | 5/2002 | .......... B60R/21/34 |
| JP | 07246908 A | * | 9/1995 | .......... B60R/21/34 |
| JP | 09164906 A | * | 6/1997 | .......... B60R/21/34 |
| JP | A-2001-063499 | | 3/2001 | |
| JP | A-2001-315599 | | 11/2001 | |
| JP | 2001334895 A | * | 12/2001 | .......... B60R/21/00 |

* cited by examiner

*Primary Examiner*—Paul N. Dickson
(74) *Attorney, Agent, or Firm*—Posz Law Group, PLC

(57) ABSTRACT

A pedestrian protection airbag system includes a control unit, an airbag, an inflator, a movement unit for moving a cover member to thereby allow the airbag to thrust out from an airbag storage portion smoothly, and a drawing unit for drawing out the airbag. The control unit receives signals from sensors, and can perform detection in two stages. In one of the stages the control unit performs touch detection such that the control unit can anticipate that a vehicle will touch a pedestrian, while in the other stage the control unit performs approach detection before the touch detection such that the control unit detects the pedestrian approaching the vehicle. The movement unit and the drawing unit are actuated by the control unit detecting a pedestrian approaching the vehicle. The inflator is actuated by the control unit detecting calculated touch to the pedestrian.

12 Claims, 21 Drawing Sheets

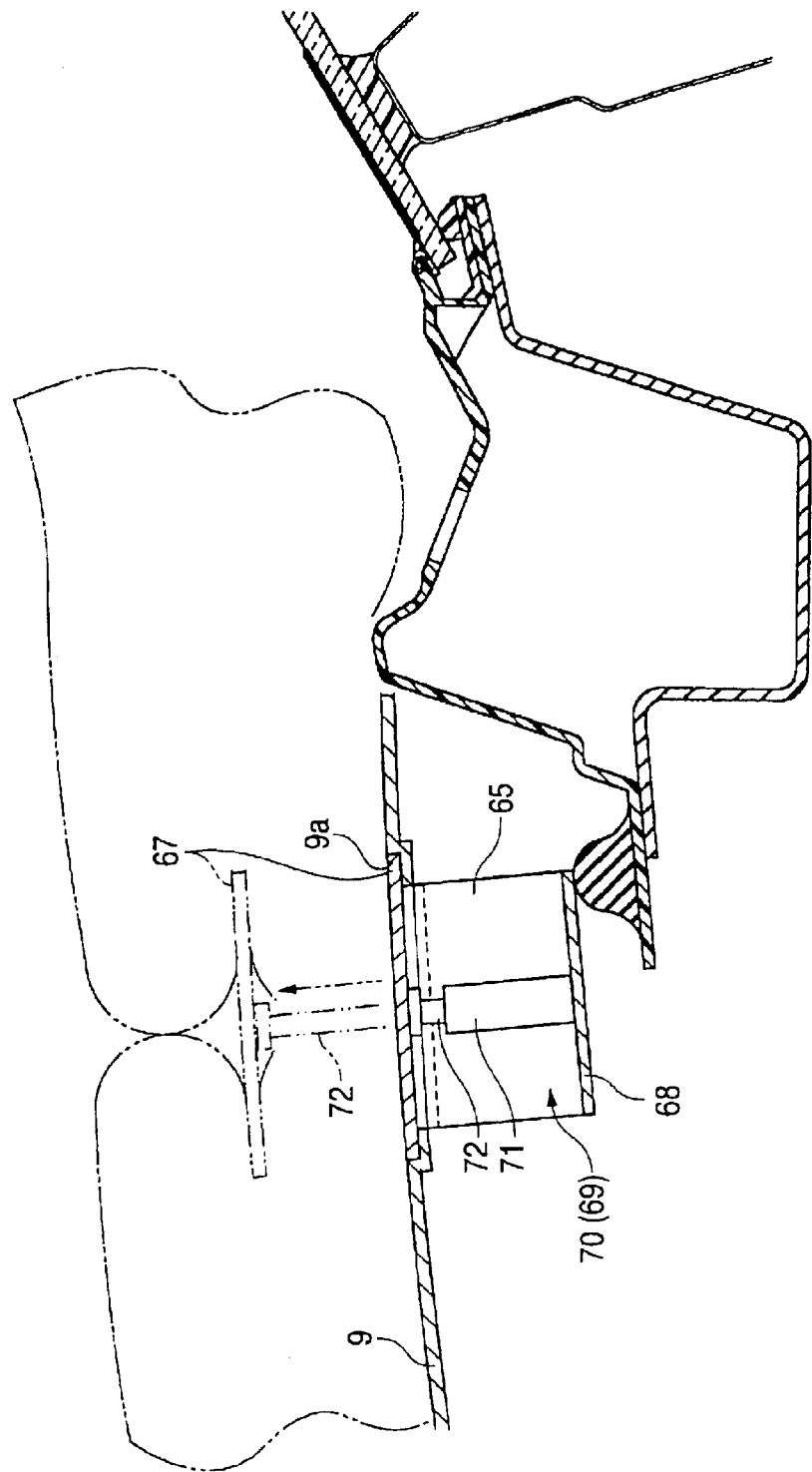

PEDESTRIAN PROTECTION AIRBAG SYSTEM

The present application is based on Japanese Patent Application No. 2002-255277, the entire contents of which are incorporated herein by reference.

BACKGROUND OF THE INVENTION

1. Field of the Invention

The present invention relates to a pedestrian protection airbag system in which an airbag can be thrust out from an airbag storage portion and inflated to be disposed between a vehicle and a pedestrian so as to protect the pedestrian when the vehicle is to touch the pedestrian.

2. Related Art

In the related art, there is a pedestrian protection airbag system as disclosed in Japanese Patent Laid-Open No. 2001-063499 or Japanese Patent Laid-Open No. 2001-315599. In the pedestrian protection airbag system, an airbag is folded and stored on a front portion side of a vehicle. When it is anticipated that the vehicle will collide with a pedestrian, inflation gas is made to flow into the airbag so that the airbag is inflated to prevent the pedestrian from touching the vehicle directly. Thus the pedestrian is protected by the airbag.

In such a pedestrian protection airbag system, it has been desired that the actuation time required since detecting that the vehicle will inevitably touch the pedestrian and till completely inflating the airbag is made as short as possible.

However, there is a limit in shortening such an actuation time. When the vehicle speed is high, there is a fear that the vehicle may collide with the pedestrian before the airbag is completely inflated.

SUMMARY OF THE INVENTION

In order to solve the foregoing problem, an object of the invention is to provide a pedestrian protection airbag system in which the time required since the start of inflation of an airbag and till the completion of the inflation of the airbag can be shortened to the utmost.

A pedestrian protection airbag system according to the invention includes:

a control unit for controlling actuation of the pedestrian protection airbag apparatus, the control unit receiving signals from sensors capable of detecting that a vehicle mounted with the pedestrian protection airbag system will touch a pedestrian;

an airbag for thrusting out from an airbag storage portion while being inflated, so as to be disposed between the pedestrian and the vehicle;

an inflator to be actuated to supply inflation gas to the airbag; and a thrust assist for allowing the airbag to thrust out from the airbag storage portion smoothly;

wherein the control unit receives signals from the sensors to perform detection in two stages, in one of which the control unit performs touch detection such that the control unit can anticipate that the vehicle will touch the pedestrian, while in the other stage the control unit performs approach detection before the touch detection such that the control unit detects the pedestrian approaching the vehicle;

wherein the thrust assist is actuated by the control unit detecting the pedestrian approaching the vehicle; and wherein the inflator is actuated by the control unit detecting that the vehicle will touch the pedestrian.

In the pedestrian protection airbag system according to the invention, when the control unit detects a pedestrian approaching the vehicle, the control unit will actuate the thrust assist. When the control unit further detects calculated touch to the pedestrian, the control unit will actuate the inflator so as to supply inflation gas to the airbag. Thus, prior to the actuation of the inflator, the thrust assist is actuated to prepare the airbag to thrust out smoothly from the airbag storage portion. As a result, the airbag can be completely inflated quickly with the inflation gas flowing therein from the inflator.

Accordingly, in the pedestrian protection airbag system according to the invention, the thrust assist is actuated before the inflation of the airbag is started. Thus, the airbag is in advance prepared to thrust out smoothly from the airbag storage portion. As a result, the time required since the start of inflation of the airbag and till the completion of the inflation of the airbag can be shortened to the utmost.

When the thrust assist includes a movement unit operating to move a cover member covering the airbag storage portion so as to expose the stored airbag to the outside of the vehicle when the movement unit is actuated, it is possible to obtain operation/effect as follows. That is, the cover member covering the airbag storage portion moves due to the actuation of the movement unit in response to approach detection so that the stored airbag is exposed to the outside of the vehicle before the inflation gas flows into the airbag. Consequently, when the inflation gas flows into the airbag from the inflator in response to touch detection in which it is anticipated that the vehicle will touch the pedestrian, the airbag can thrust out from the airbag storage portion quickly without interfering with the cover member. Thus, the time required since the start of the inflation of the airbag and till the completion of the inflation of the airbag can be shortened to the utmost of the airbag. In addition, according to such a configuration, the airbag is covered with the cover member before actuation. Accordingly, the exterior design of the vehicle can be improved even if the airbag is stored in the vehicle.

When the thrust assist includes a drawing unit operating to draw out at least a part of the stored airbag from the airbag storage portion when the drawing unit is actuated, it is possible to obtain operation/effect as follows. That is, at least a part of the airbag is drawn out from the airbag storage portion due to the actuation of the drawing unit in response to approach detection before the inflation gas flows into the airbag. Subsequently, when the inflation gas flows into the airbag from the inflator in response to touch detection in which it is anticipated that the vehicle will touch the pedestrian, the airbag can thrust out easily from the airbag storage portion. Thus, the time required since the start of the inflation of the airbag and till the completion of the inflation of the airbag can be shortened to the utmost.

Incidentally, in this case, when the thrust assist includes not only the drawing unit but also the movement unit for moving the cover member, the time required since the start of inflation of the airbag and till the completion of the inflation of the airbag can be made shorter.

Further, when touch detection is not obtained even after the approach detection, the thrust assist may be actuated by the control unit so as to restore any portion of the thrust assist actuated after approach detection, to its unactuated state. In this case, it is possible to obtain operation/effect as follows. That is, when touch detection is not obtained even after approach detection, the thrust assist automatically recovers its initial state before actuation. Thus, the system according to the invention can be made to stand by until the next anticipation that the vehicle will touch a pedestrian. As a result, it is economical that various members do not have to be exchanged. Not to say, a driver or the like does not have to make any effort to restore members actuated in response to approach detection. Thus, a burden on the driver or the like can be eliminated.

For example, the airbag may be stored on a front portion side of the vehicle so that the airbag can cover at least an area ranging from a front surface of the vehicle near a front grille thereof to a front-portion-side top surface of a hood panel of the vehicle when the airbag is completely inflated. The airbag configured thus can protect any pedestrian who is going to touch the front portion side of the front grille or the hood panel of the vehicle.

When the thrust assist includes the movement unit operating to move the cover member covering the airbag storage portion so as to expose the stored airbag to the outside of the vehicle when the movement unit is actuated, and the airbag is stored in a front bumper of the vehicle, the following configuration may be adopted. That is, the cover member for covering the stored airbag is formed as the front bumper of the vehicle. When the movement unit is actuated, the movement unit moves the front bumper so as to expose the stored airbag from above. In such a configuration, the airbag can be inflated quickly to cover the front portion side of the front grill or the hood panel of the vehicle. That is, the time required since the start of the inflation of the airbag and till the completion of the inflation of the airbag can be shortened. In addition, since the front bumper is used as the cover member for covering the airbag storage portion, it is not necessary to mount another cover member on the vehicle.

Further, when the thrust assist includes the drawing unit operating to draw out at least a part of the stored airbag from the airbag storage portion when the drawing unit is actuated, and the airbag is stored in the front bumper of the vehicle, the following configuration is desired. That is, the drawing unit is designed to draw out at least a part of the stored airbag toward the front surface of the front grille of the vehicle when the drawing unit is actuated. Also according to this configuration, the airbag can be inflated quickly to cover the front portion side of the front grill or the hood panel of the vehicle. That is, the time required since the start of the inflation of the airbag and till the completion of the inflation of the airbag can be shortened.

Incidentally, in this case, when the thrust assist includes not only the drawing unit but also the movement unit for moving the cover member (front bumper), the time required since the start of inflation of the airbag and till the completion of the inflation of the airbag can be made shorter.

It is desired that the drawing unit is designed to draw out at least a part of the airbag clear of an area in front of each head lamp of the vehicle when the drawing unit is actuated. According to such a configuration, there is no fear that any head lamp is covered with the airbag even when the drawing unit is actuated during motion with the head lamps lighted at night or the like. Thus, forward visibility can be secured. Incidentally, the airbag may be suitably designed to cover or not to cover the head lamps after the start of inflation in accordance with the vehicle.

For example, the airbag may be stored in a vicinity of a cowl of the vehicle so that the airbag can cover at least an area ranging from a rear-portion-side top surface of a hood panel of the vehicle to a lower-portion front surface of a wind shield of the vehicle when the airbag is completely inflated. The airbag configured thus can protect any pedestrian who is going to touch the vicinity of the cowl of the vehicle, that is, the area ranging from the rear portion of the hood panel to the lower-portion front surface of the wind shield.

In this case, when the airbag has a pillar cover portion capable of covering a front surface side of a front pillar of the vehicle, the airbag can also protect any pedestrian who is going to touch the front pillar.

When the thrust assist include the movement unit operating to move the cover member covering the airbag storage portion so as to expose the stored airbag to the outside of the vehicle when the movement unit is actuated, while the airbag is stored near the rear end of the hood panel of the vehicle, the following configuration may be adopted. That is, the cover member is disposed above the airbag storage portion and on a rear-end-side top surface of the hood panel, while the movement unit moves the cover member upward so as to expose the stored airbag from above when the movement unit is actuated. According to such a configuration, the airbag can be inflated quickly to cover the vicinity of the cowl of the vehicle. That is, the time required since the start of the inflation of the airbag and till the completion of the inflation of the airbag can be shortened.

In this case, the following configuration may be further adopted. That is, the thrust assist further includes the drawing unit capable of drawing out a part of the stored airbag from the airbag storage portion when the drawing unit is actuated. The drawing unit is designed to draw out a part of the stored airbag substantially in the front/rear direction of the vehicle from the opening formed due to the movement of the cover member caused by the actuation of the movement unit. Thus, the time required since the start of inflation of the airbag and till the completion of the inflation of the airbag to cover the vicinity of the cowl of the vehicle can be made shorter.

BRIEF DESCRIPTION OF THE DRAWINGS

FIG. 18 is a schematic side view taken on line XVIII—XVIII in FIG. 2, showing a movement unit in the pedestrian protection airbag system according to the second embodiment.

DETAILED DESCRIPTION OF THE PREFERRED EMBODIMENTS

Figure 1:
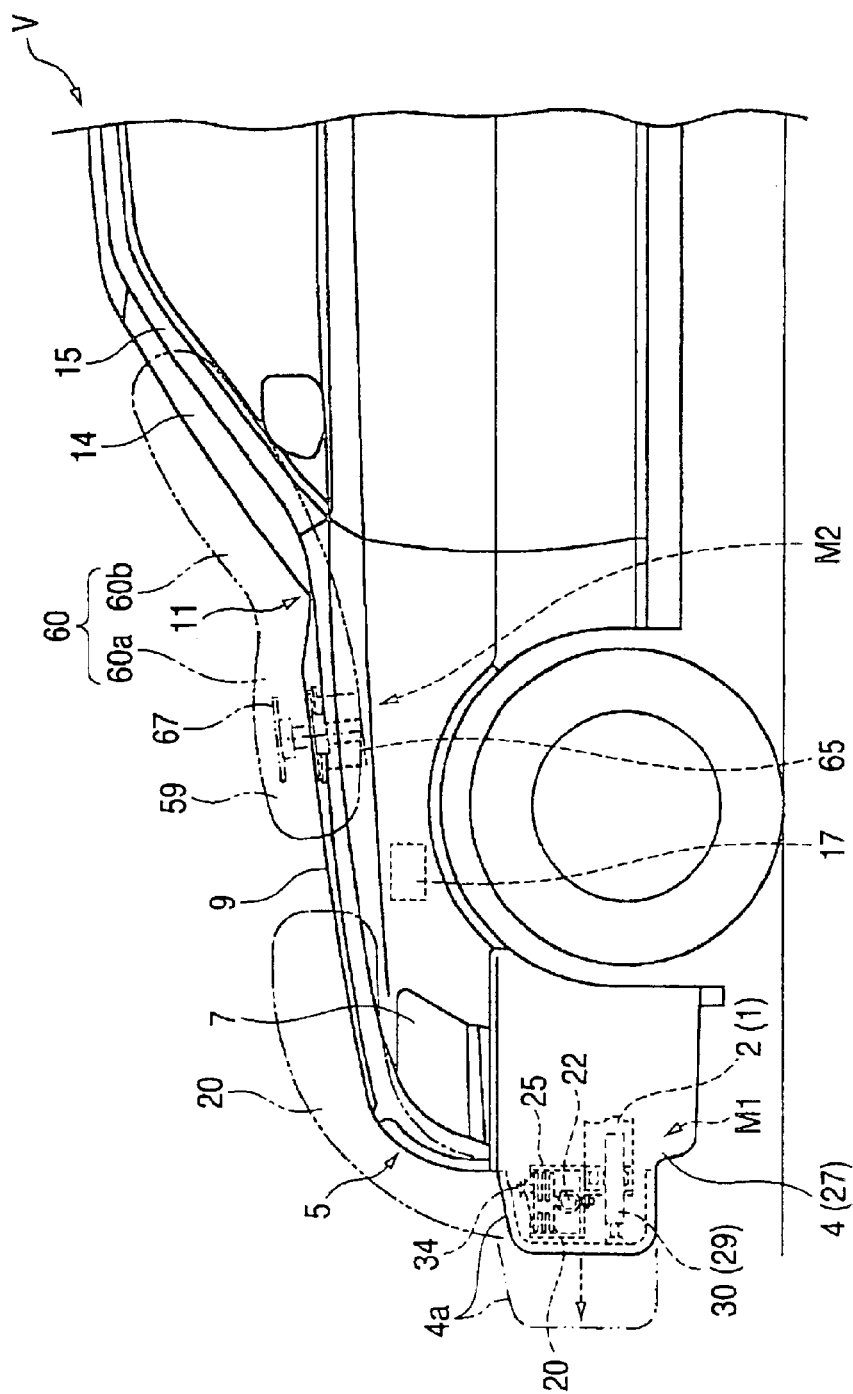
FIG. 1 is a schematic partial side view of a vehicle mounted with a pedestrian protection airbag system according to a first or second embodiment of the invention.

An embodiment of the invention will be described below with reference to the drawings. Incidentally, in the specification, the front/rear direction is based on a direction along the front/rear direction of a vehicle, and the left/right direction is based on a direction along the left/right direction of the vehicle viewed from the rear side to the front side of the vehicle.

A pedestrian protection airbag system M1 according to a first embodiment of the invention includes an airbag 20, an inflator 22, a casing 25, a control unit 17 and a thrust assist 29 as shown in FIGS. 1 to 5. The airbag 20 is stored in a front bumper 4 on the front portion side of a vehicle V. The inflator 22 supplies inflation gas to the airbag 20. The casing 25 stores the airbag 20 and the inflator 22. The control unit 17 supplies an operating signal to the inflator 22. The thrust assist 29 is provided for thrusting out the airbag 20 smoothly from the casing 25 as an airbag storage portion.

Incidentally, in this vehicle V, a pedestrian protection airbag system M2 according to a second embodiment of the invention is also mounted near a cowl 11. An airbag 60 of the airbag system M2 is designed to cover the area ranging from the vicinity of the rear-portion top surface of a hood panel 9 to the vicinity of the lower-portion front surface of a front wind shield 14 when the airbag 60 is completely inflated.

Figure 3:
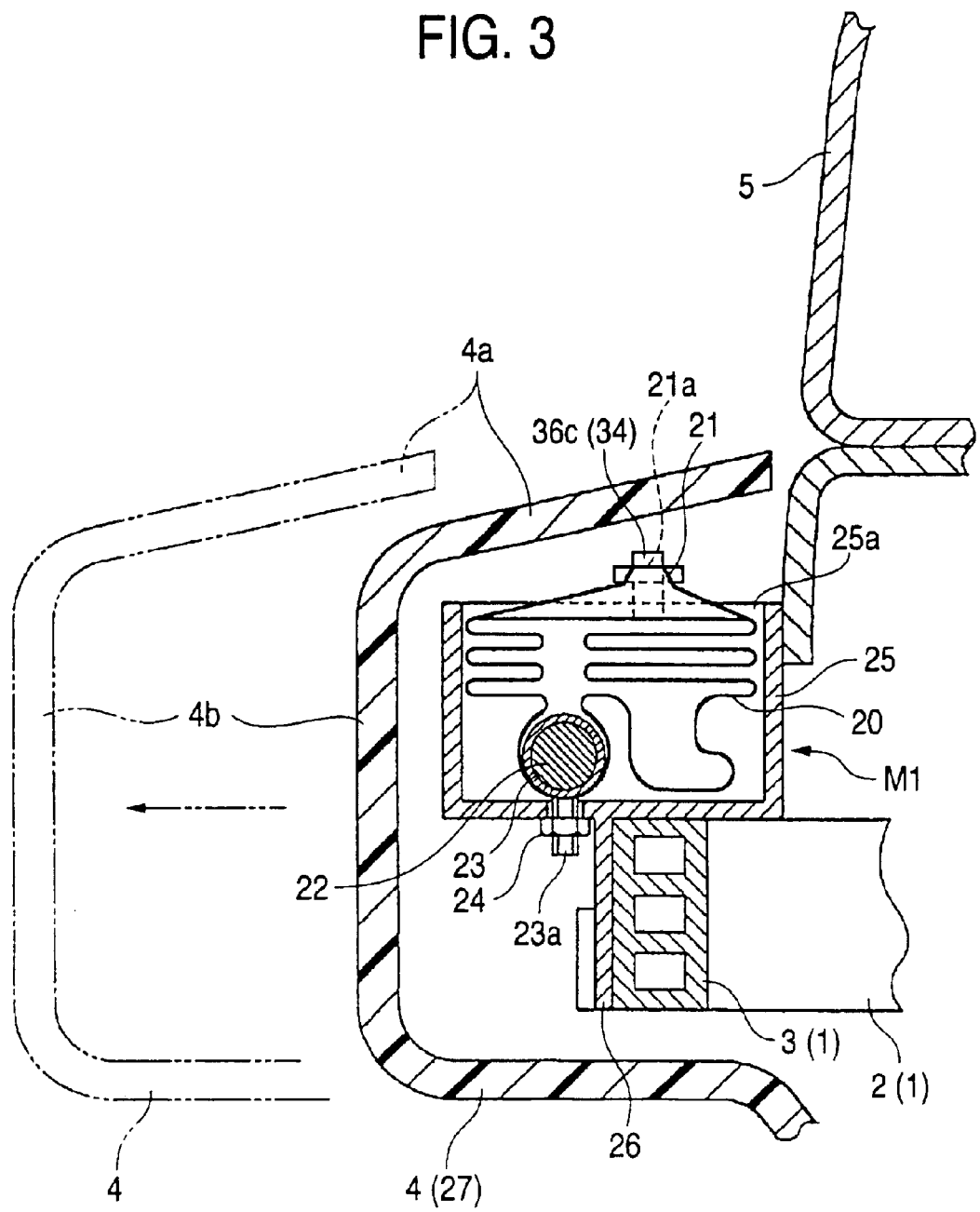
FIG. 3 is a schematic and longitudinal sectional view taken on line III—III in FIG. 2, showing the pedestrian protection airbag system according to the first embodiment.
Figure 4:
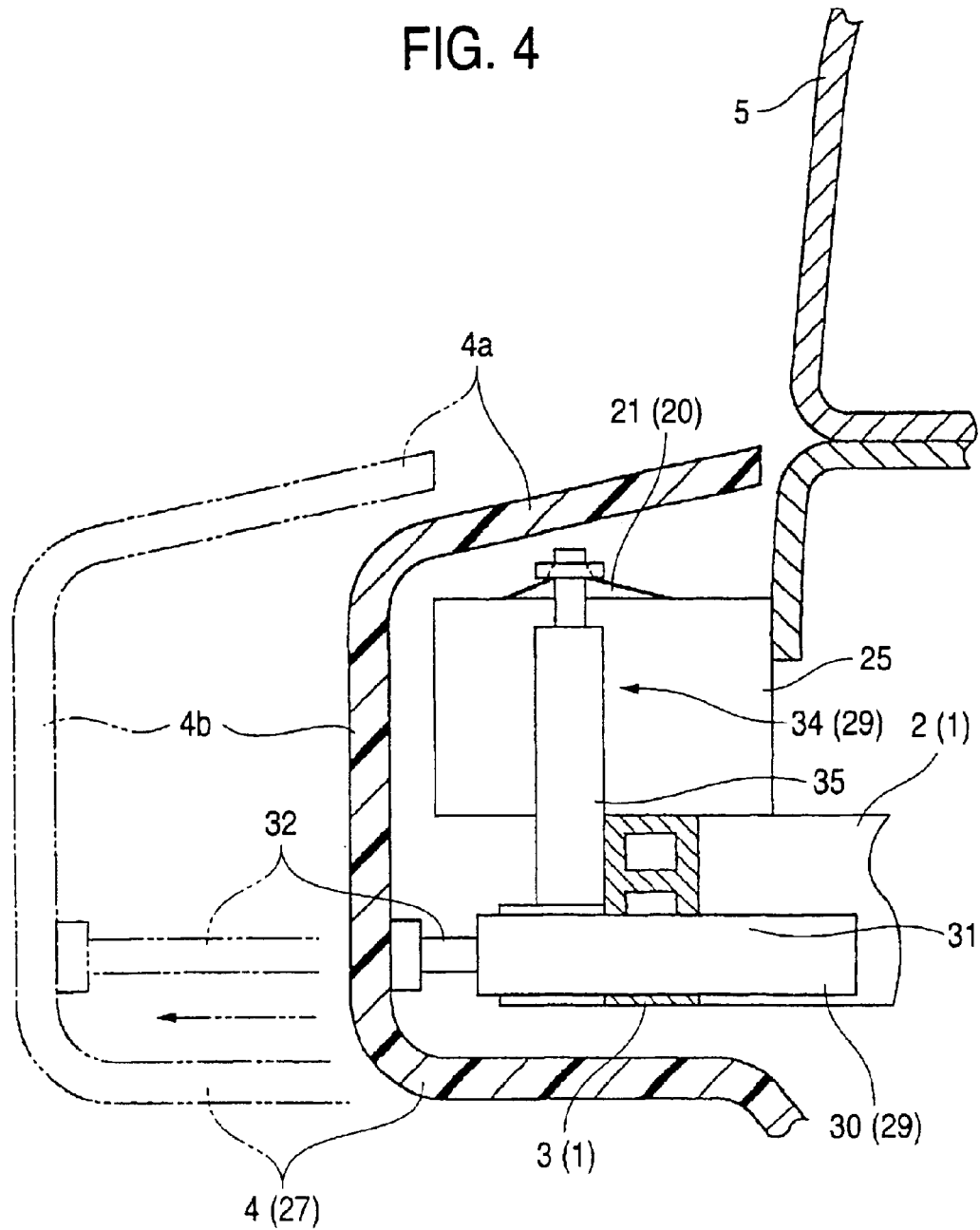
FIG. 4 is a schematic side view taken on line IV—IV in FIG. 2, showing a movement unit in the pedestrian protection airbag system according to the first embodiment.
Figure 5:
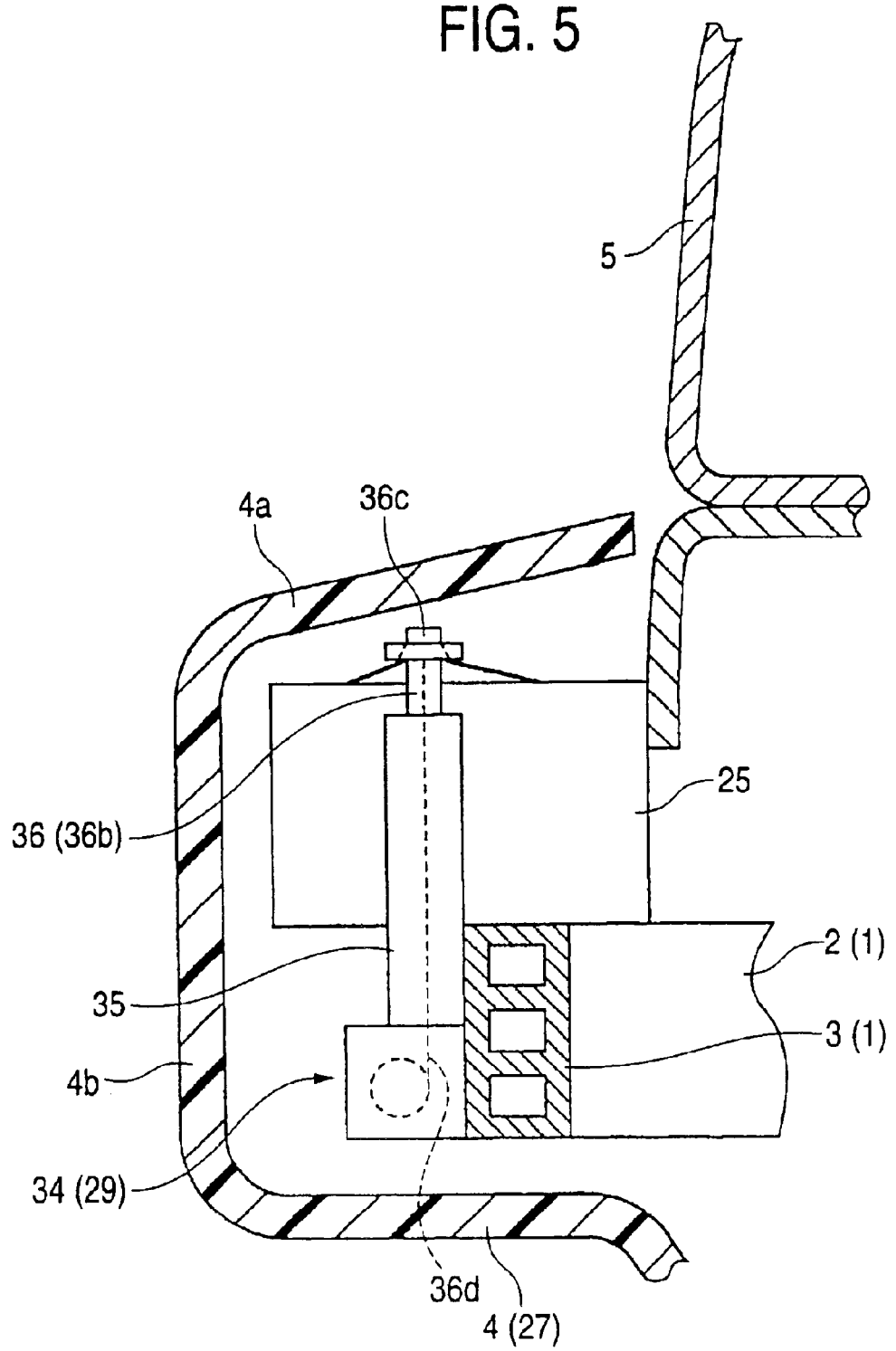
FIG. 5 is a schematic side view taken on line V—V in FIG. 2, showing the actuation of a drawing unit in the pedestrian protection airbag system according to the first embodiment.

The casing 25 is made of metal such as sheet metal, and formed into a substantially rectangular parallelepiped box-like shape having a substantially U-shape in section with an open top. The casing 25 has flange portions 26 extending downward. By use of bolts and nuts, or the like, the flange portions 26 are fixed to the front surface sides of bumper reinforcements 3, which will be on the body 1 side of the vehicle. Thus, the casing 25 is mounted on the vehicle V along the reinforcements 3. Then, the casing 25 is mounted on the vehicle V so that the top-surface-side opening 25a of the casing 25 is covered with an upper wall portion 4a of a front bumper 4. In addition, the casing 25 is disposed near the left/right-direction center of the vehicle V so that the left/right-direction width of the casing 25 is made slightly smaller than the distance between left and right head lamps 7 and 7 of the vehicle V (see FIG. 2 and FIGS. 7A and 7B). Incidentally, a member 2 shown in FIGS. 3 to 5 is a side member 2 for coupling the reinforcement 3 with its front edge.

Figure 2:
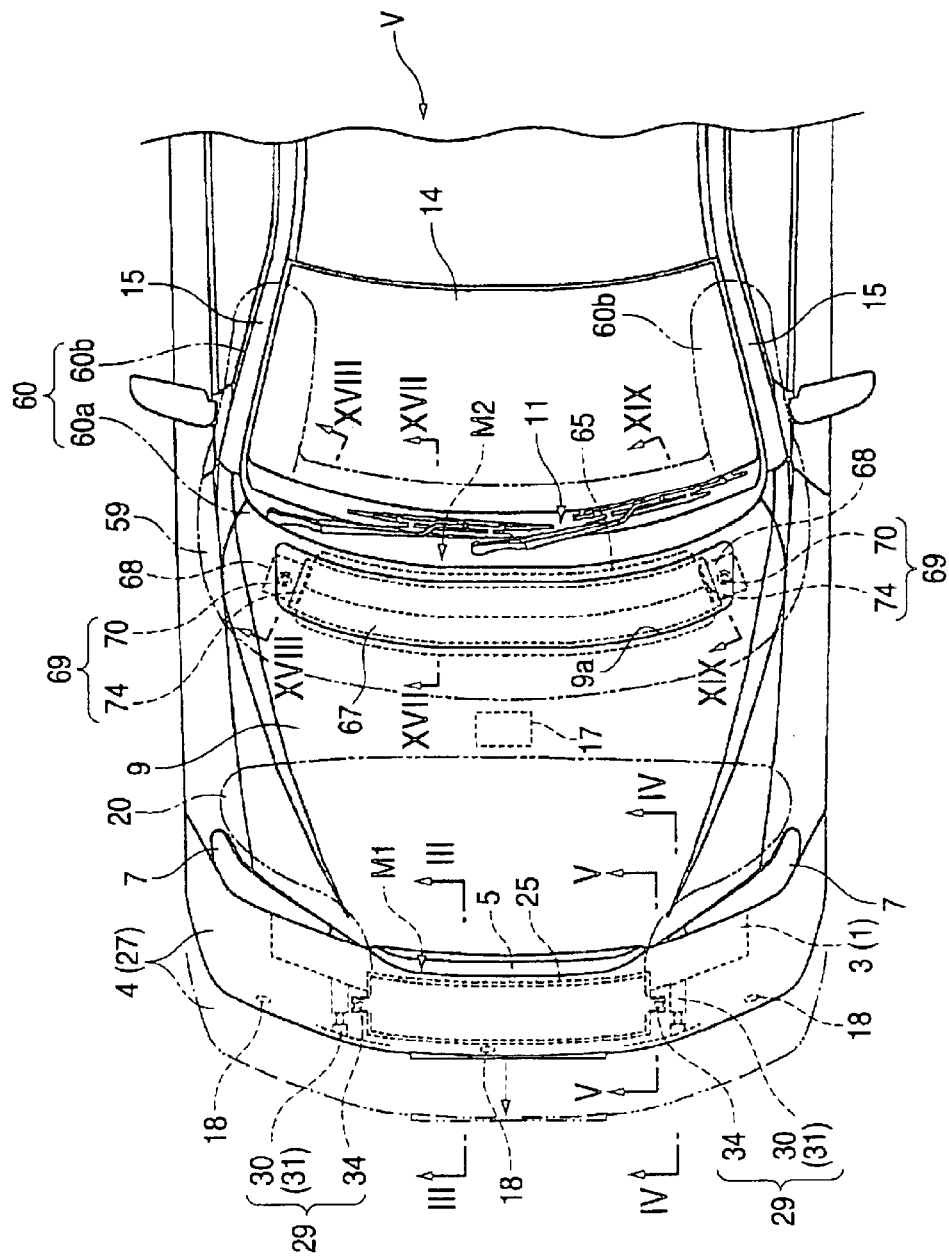
FIG. 2 is a schematic partial plan view of the vehicle mounted with the pedestrian protection airbag system according to the first or second embodiment.
Figure 11:
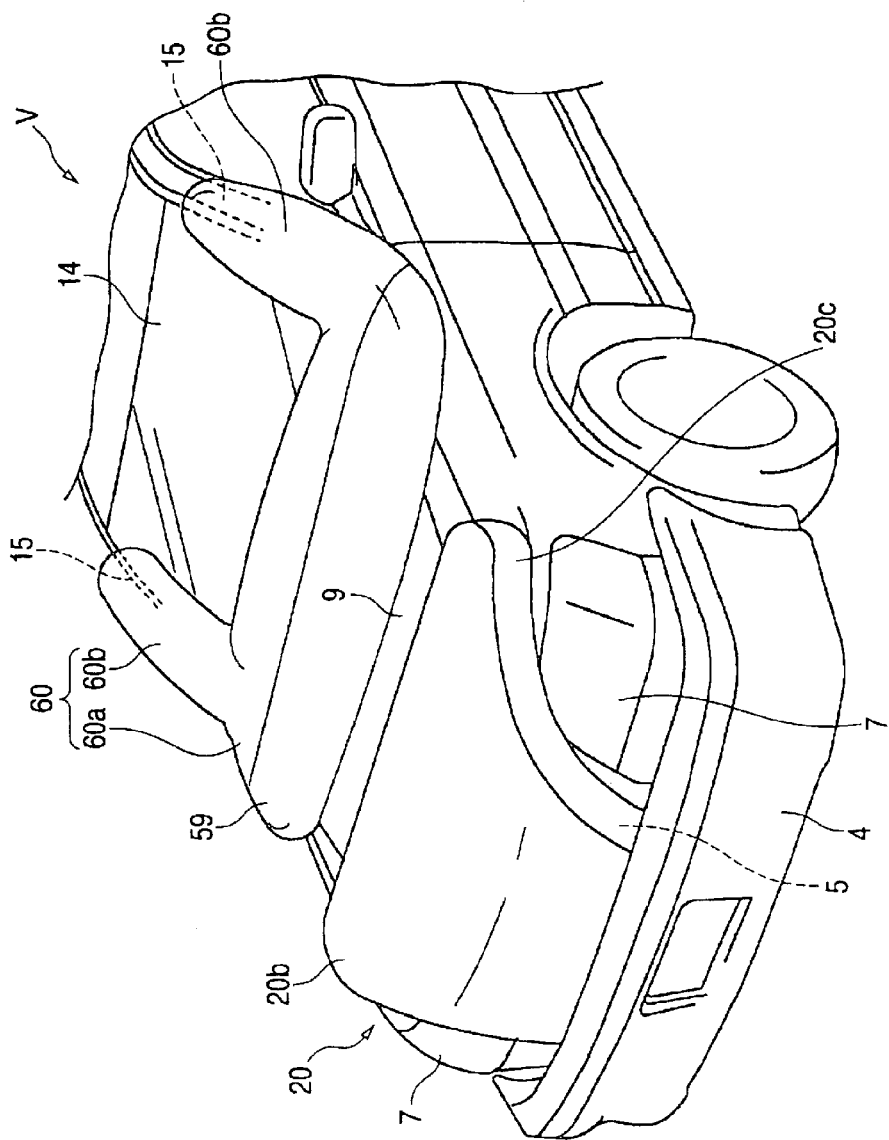
FIG. 11 is a perspective view showing the state where the airbag according to the first or second embodiment is completely inflated.

As shown in FIGS. 1, 2 and 11, the airbag 20 is designed to be able to cover at least the area ranging from the front surface of the vehicle V near a front grille 5 to the front-portion-side top surface of the hood panel 9 of the vehicle V when the airbag 20 is completely inflated. The airbag 20 is formed by draping woven cloth plain-woven from synthetic fiber such as polyamide fiber or polyester fiber, and combining the draped woven cloth into a three-dimensional bag-like shape by stitching, bonding or the like.

Figure 12:
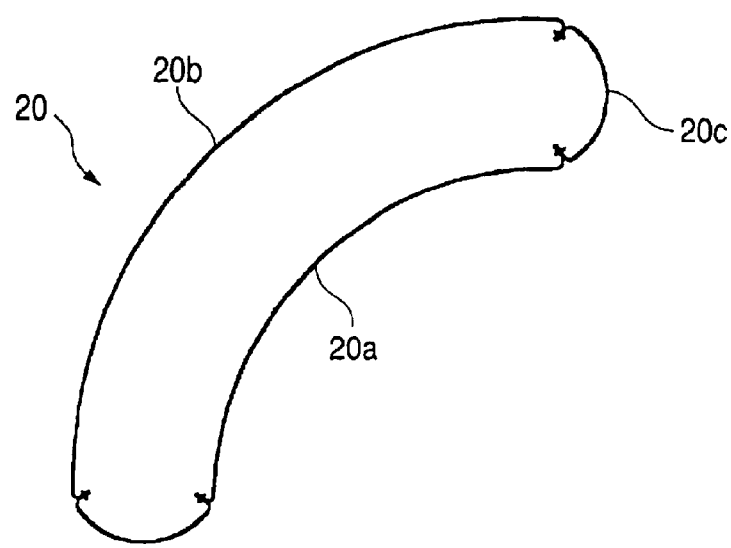
FIG. 12 is a longitudinal sectional view showing the state where the airbag according to the first embodiment is completely inflated.

In the first embodiment, the airbag 20 completely inflated has a substantially triangular plate-like shape extending upward from the casing 25 and bent backward from the vicinity of the upper end of the front grille 5 so as not to cover the left and right head lamps 7 and 7. Incidentally, in this embodiment, the airbag 20 is constituted by three pieces of woven cloth, that is, a vehicle-body-side wall portion 20a, a pedestrian-side wall portion 20b and a circumferential wall portion 20c connecting the outer circumferential edges of the wall portions 20a and 20b with each other, as shown in FIGS. 11 and 12.

Figure 6A:
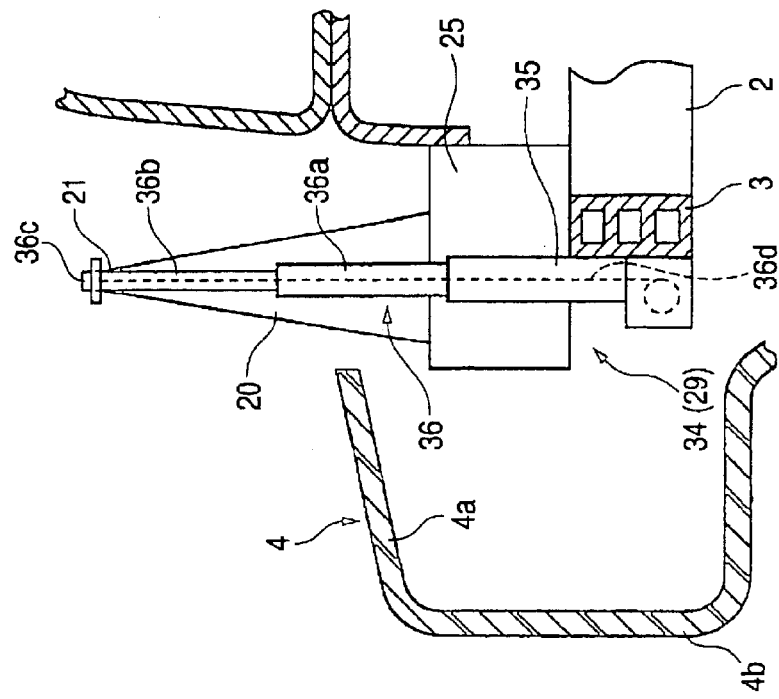
FIGS. 6A and 6B are schematic side views showing the actuation of the drawing unit in the pedestrian protection airbag system according to the first embodiment.
Figure 6B:
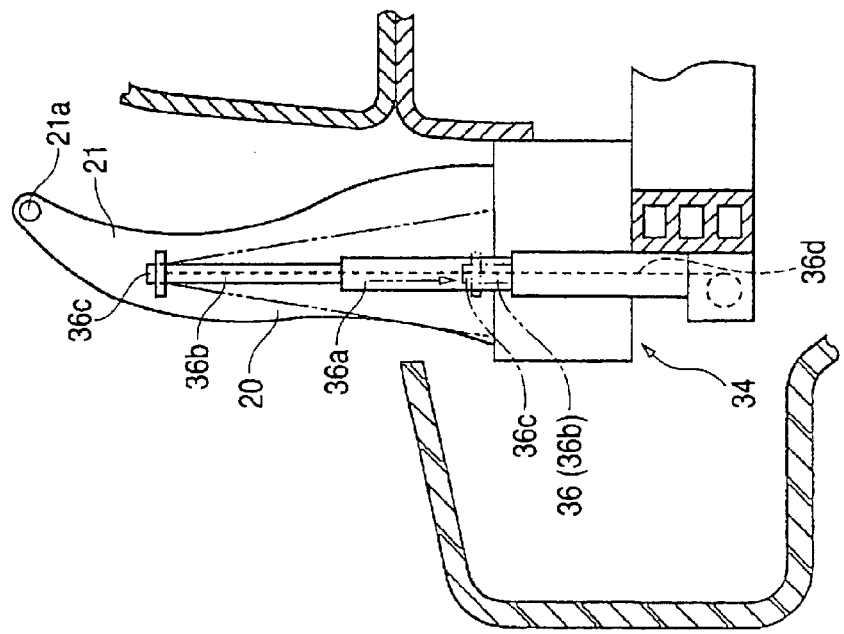

In addition, as shown in FIGS. 6A and 6B, the airbag 20 includes lock portions 21 each having a lock hole 21a to be detachably locked in a lock portion 36c at the upper end of each operating piece 36 in a drawing unit 34 which will be described later. The airbag 20 is folded and stored in the casing 25 while having the inflator 22 stored inside as shown in FIG. 3. Then, when the airbag 20 is stored in the casing 25, the lock portions 21 are thrust out to the opposite, left and right sides of the casing 25 so as to be locked in the lock portions 36c of the drawing unit 34 respectively.

Figure 7A:
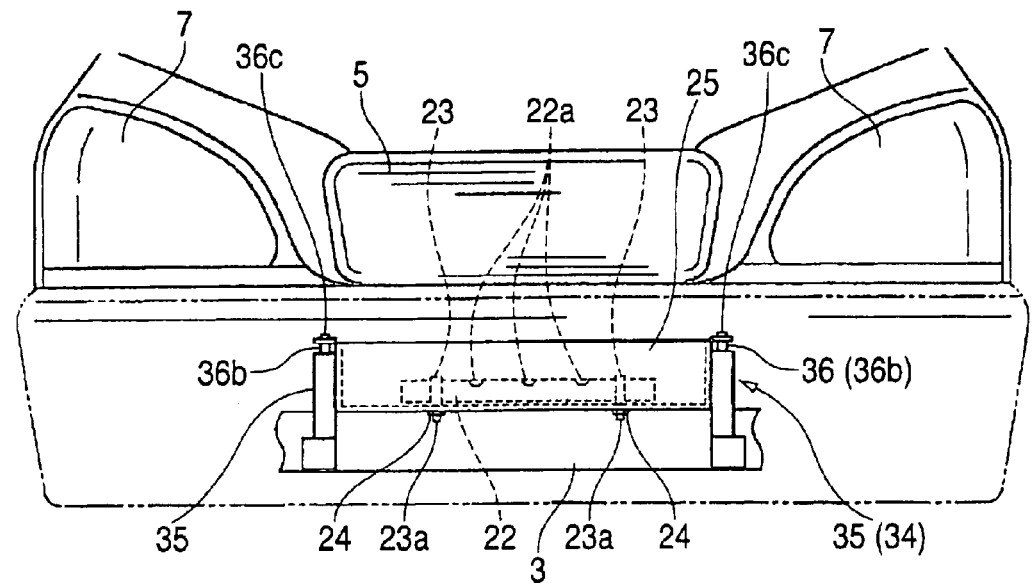
FIGS. 7A and 7B are schematic front views showing the actuation of the drawing unit in the pedestrian protection airbag system according to the first embodiment.
Figure 7B:
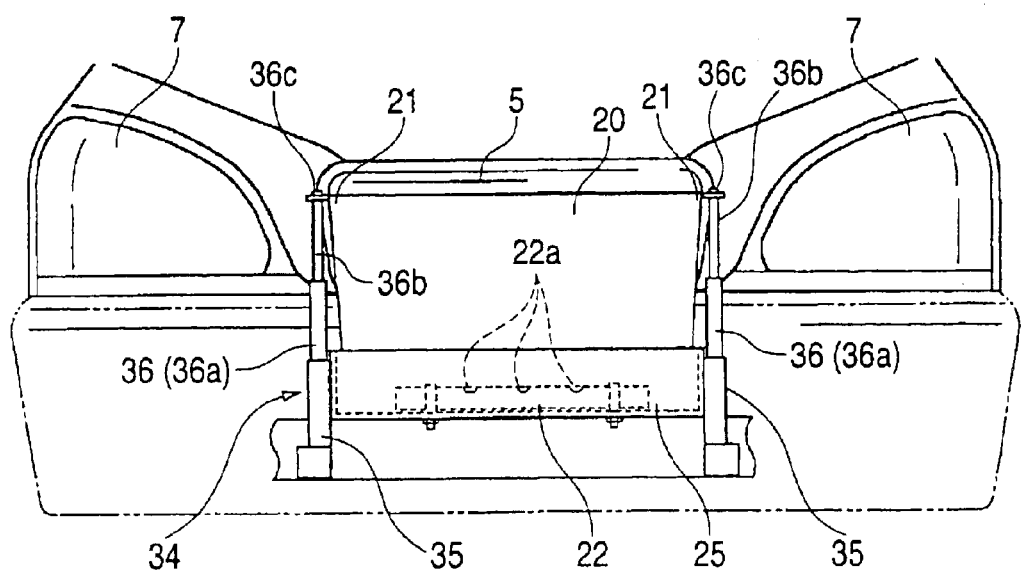

The operation of the inflator 22 is controlled by the control unit 17. The inflator 22 has a columnar shape having gas discharge ports 22a, and is retained by a plurality of toroidal mounting brackets 23 each having a bolt 23a projecting thereon, as shown in FIG. 3 and FIGS. 7A and 7B. The inflator 22 is fixed to the casing 25 together with the airbag 20 by making the bolts 23a of the brackets 23 penetrate the casing 25 and fixing the bolts 23a with nuts 24 respectively.

The control unit 17 is disposed in a predetermined position in the vehicle V, and electrically connected to a plurality of sensors 18. Each sensor 18 is disposed in the bumper 4 or the like so that the sensor 18 can detect a pedestrian approaching the vehicle V. Examples of the sensors 18 may include a type using infrared rays or ultrasonic waves or a type using a CCD camera. The control unit 17 is designed to receive signals from the respective sensors 18, and to perform detection in two stages in consideration of the vehicle speed and so on. In one of the stages the control unit 17 performs touch detection such that the control unit 17 can anticipate that the vehicle V will touch a pedestrian, while in the other stage the control unit 17 performs approach detection before the touch detection such that the control unit 17 detects the pedestrian approaching the vehicle V. Then, in response to the approach detection, the control unit 17 actuates a movement unit 30 of the thrust assist 29 while actuating the drawing unit 34. In response to the touch detection after the approach detection, the control unit 17 actuates the inflator 22. In addition, when the touch detection is not obtained even after the approach detection, it may be determined from the distance between the pedestrian and the vehicle V and the vehicle speed that the vehicle V will not touch the pedestrian. In such a case, the control unit 17 does not actuate the inflator 22, but actuates the drawing unit 34 so as to recover its unactuated state while actuating the movement unit 30 so as to restore it to its initial position. Thus, the movement unit 30 and the drawing unit 34 of the thrust assist 29 recover their unactuated states again.

Incidentally, in this embodiment, the control unit 17 and the respective sensors 18 are shared with the pedestrian protection airbag system M2 according to the second embodiment.

In the first embodiment, the thrust assist 29 includes the movement unit 30 and the drawing unit 34, the actuation of each of which is controlled by the control unit 17. When the movement unit 30 is actuated, the movement unit 30 operates to move the cover member covering the airbag storage portion storing the airbag 20, so as to expose the stored airbag 20 to the outside of the vehicle. When the drawing unit 34 is actuated, the drawing unit 34 operates to draw out at least a part of the stored airbag 20 from the airbag storage portion.

The movement unit 30 is constituted by two actuators 31 and 31 fixed to the bumper reinforcements 3 near the opposite, left and right sides of the casing 25 as shown in FIGS. 1, 2 and 4. Each actuator 31 is designed to move a corresponding operating piece 32 forward and backward in the front/rear direction. A front wall portion 4b of the front bumper 4 is fixed to the front ends of the operating pieces 32. Thus, when the respective operating pieces 32 move forward, the bumper 4 having a function as the cover member 27 covering the folded and stored airbag 20 also moves forward so that the airbag 20 stored in the casing 25 is exposed from above to the outside of the vehicle.

Incidentally, examples of the actuators 31 may include electric motors, hydraulic motors, electromagnetic solenoids, etc, capable of moving the bumper 4 forward and backward in the front/rear direction. It is necessary to move the bumper 4 more quickly when moving the bumper 4 forward to thereby expose the airbag 20 to the outside of the vehicle than when moving the bumper 4 backward to return the bumper 4 to its initial position after once moving the bumper 4 forward. To this end, it is desired that spring force using compressed springs is used for moving the operating pieces 32 forward, while the operating pieces 32 are moved backward with the springs being compressed when the operating pieces 32 are returned to their initial positions.

In addition, in order to reduce the weight of the bumper 4 acting on the operating pieces 32, it is desired that the bumper 4 is movably retained by predetermined support brackets, or the like, coupled with the bumper reinforcements 3.

The drawing unit 34 is constituted by two actuators 35 disposed respectively near the left and right sides of the casing 25 and between the casing 25 and each actuator 31 of the movement unit 30 and fixed to the reinforcements 3 as shown in FIGS. 2 and 5. Each actuator 35 has an operating piece 36, which is recoverably paid out upward. The operating piece 36 has two-stages of extension members 36a and 36b, having in turn a tapered cylindrical shape narrowed in its top end with a smaller diameter. Each actuator 35 acts as follows in the same manner as an automatic antenna, or the like, mounted on the vehicle. That is, a core member 36d made of a bendable, belt-like metal tape, or the like, and disposed inside the actuator 35 is coupled with the upper end of the extension member 36b. The core member 36d is paid out to thrust out the extension member 36a of the operating piece 36 from the actuator 35, and further thrust out the extension member 36b upward from the extension member 36a. After that, when the core member 36d is taken up, the extension members 36b and 36a are in turn stored in the actuator 35. In addition, a projection (lock portion) 36c is formed in the upper end of each extension member 36b. The projection 36c is detachably inserted into the lock hole 21a in a part (lock portion) 21 of the airbag 20 so as to lock the lock portion 21.

Incidentally, examples of the actuators 35 may also include electric motors, hydraulic motors, etc. It is, however, necessary for the actuators 35 to move the lock portions 21 of the airbag 20 more quickly when moving the lock portions 21 of the airbag 20 upward to thereby draw the lock portions 21 of the airbag 20 out than when moving the lock portions 21 of the airbag 20 to thereby return the lock portions 21 of the airbag 20 to their initial positions after once drawing the lock portions 21 of the airbag 20 out. To this end, it is desired that spring force using compressed springs is used for paying out the core members 36d, while the operating pieces 36 are moved down with the springs being compressed when the lock portions 21 are returned to their initial positions.

In addition, the respective actuators 35 and 35 of the drawing unit 34 are disposed on the central side of the vehicle V with respect to the left and right head lamps 7 and 7. Thus, the actuators 35 and 35 are designed to prevent the circumferential edges of the lock portions 21 of the airbag 20 drawn out from the casing 25 from being disposed in any areas in front of the head lamps 7 and 7 (see FIGS. 7A and 7B).

Incidentally, although the first embodiment has shown the case where the drawing unit 34 pays out a plurality of extension members 36a and 36b of each operating piece 36 upward in turn so as to draw out the vicinities of the lock portions 21 of the airbag 20 from the casing 25 by way of example, the drawing unit 34 may be replaced by a drawing unit 39 or 43 shown in FIGS. 8A and 8B or FIGS. 9A and 9B.

Figure 8A:
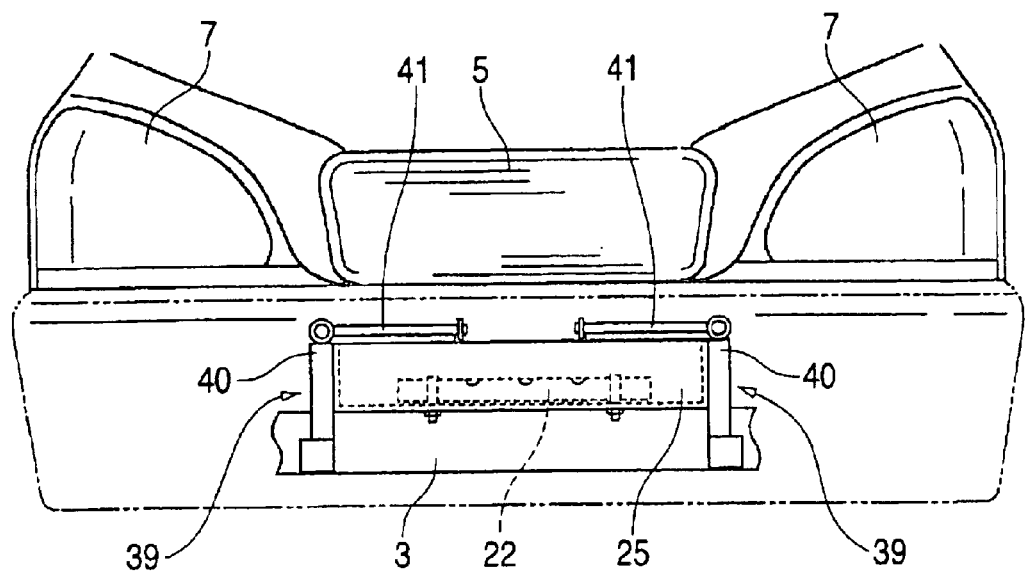
FIGS. 8A and 8B are schematic front views showing the actuation of another drawing unit.
Figure 8B:
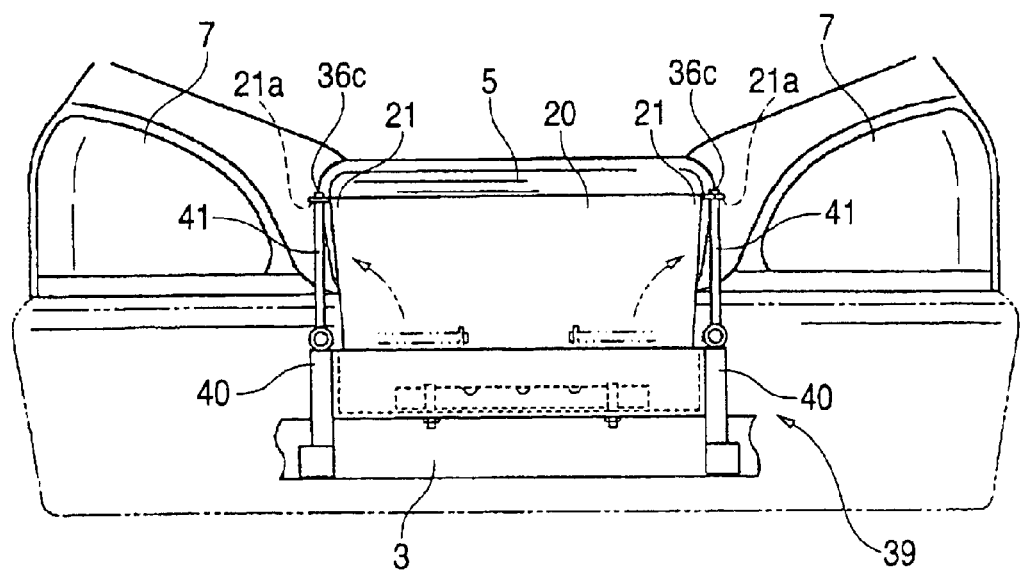

In the drawing unit 39 shown in FIGS. 8A and 8B, actuators 40 for rotating arms 41 reversibly are disposed near the opposite, left and right sides of the casing 25. At the tip of each arm 41, a lock portion 36c is formed to be detachably inserted and locked into the lock hole 21a of the corresponding lock portion 21 of the airbag 20. When the drawing unit 39 is actuated, the drawing unit 39 actuates the left and right actuators 40 so as to rotate their corresponding arms 41 and 41 upward as shown in FIGS. 8A and 8B. Thus, the vicinities of the lock portions 21 of the airbag 20 are drawn out upward from the casing 25.

Figure 9A:
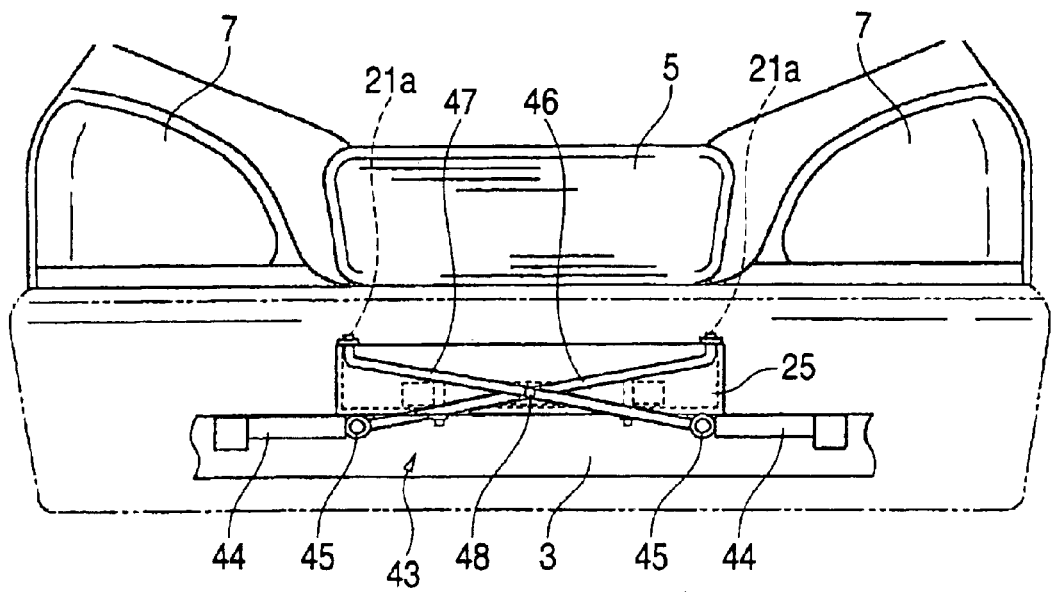
FIGS. 9A and 9B are schematic front views showing the actuation of further another drawing unit.
Figure 9B:
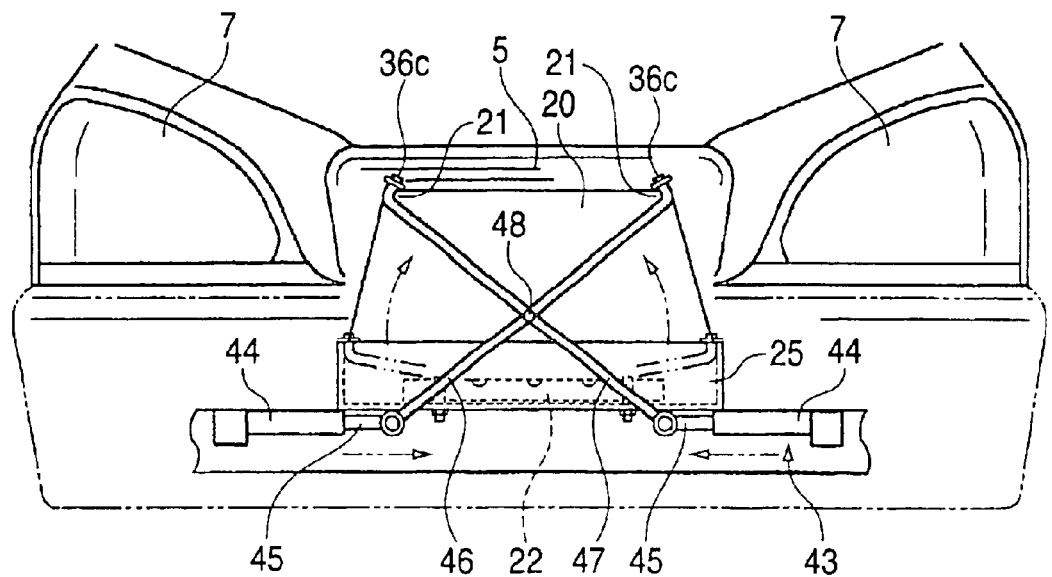

On the other hand, in the drawing unit 43 shown in FIGS. 9A and 9B, actuators 44 having operating pieces 45 and 45 movable forward/backward in the left/right direction so as to approach each other are disposed near the opposite, left and right sides of the casing 25. Further, link pieces 46 and 47 pivoted on a pin 48 rotatably with respect to each other are coupled with the tips of the operating pieces 45 respectively. The link pieces 46 and 47 extend on the left/right-direction opposite sides of the casing 25 from the operating pieces 45 coupled therewith, respectively. A lock portion 36c is disposed at the tip of each link piece 46, 47. The lock portion 36c is detachably inserted and locked into the lock hole 21a of the corresponding lock portion 21 of the airbag 20. When the drawing unit 43 is actuated, the drawing unit 43 actuates the left and right actuators 44 as shown in FIGS. 9A and 9B. Thus, the respective operating pieces 45 are paid out to approach each other so that the lock portions 36c of the link pieces 46 and 47 are moved upward like a pantograph. Thus, the vicinities of the lock portions 21 of the airbag 20 are drawn out upward from the casing 25.

Next, the operation of the pedestrian protection airbag system M1 according to the first embodiment will be described. When a pedestrian approaches the running vehicle V, the control unit 17 receiving signals from the sensors 18 will detect the pedestrian approaching the vehicle (approach detection), and actuate the thrust assist 29. When the control unit 17 detects calculated touch to the pedestrian (touch detection), the control unit 17 will actuate the inflator 22 so as to supply inflation gas to the airbag 20.

On the actuation of the thrust assist 29 in response to the approach detection, first the movement unit 30 is actuated so that the operating pieces 32 of the respective actuators 31 thrust out forward as shown by the chain double-dashed line in FIG. 4. Thus, the front bumper 4 is moved forward so that the airbag 20 stored in the casing 25 is exposed from above to the outside of the vehicle. In addition, the drawing unit 34 is actuated so that the extension members 36a and 36b in the operating pieces 36 of the respective actuators 35 are paid out upward in turn as shown in FIGS. 5, 6A, 7A, 7B and 10. Thus, the lock portions 21 of the airbag 20 are pulled upward so that the airbag 20 is drawn out upward from the casing 25.

After that, when the detection stage changes over to the touch detection, the inflator 22 is actuated so that the inflation gas flows into the airbag 20. Thus, the airbag 20 is inflated while the lock portions 21 are released from lock in the lock portions 36c of the extension members 36b, as shown in FIG. 6B. Further, as shown in FIG. 11, the airbag 20 is completely inflated to cover the area ranging from the front surface of the vehicle V near the front grille 5 to the front-portion-side top surface of the hood panel 9 of the vehicle V. Thus, the airbag 20 can surely protect the pedestrian who is going to touch the front portion side of the front grille 5 or the hood panel 9 of the vehicle V. Incidentally, when the inflator 22 is actuated, the drawing unit 34 is operated by the control unit 17 so that the drawing unit 34 returns the extension members 36a and 36b back into the actuators 35 respectively to thereby prevent the extension members 36a and 36b from interfering with the airbag 20 which is being inflated.

When the control unit 17 does not reach the touch detection based on signals from the sensors 18 after the approach detection and therefore determines that the vehicle will not touch the pedestrian based on the distance between the pedestrian and the vehicle V and the vehicle speed, the control unit 17 controls the actuation of the drawing unit 34 and the movement unit 30 of the thrust assist 29 so as to restore the airbag 20 and the units 34 and 30 to their initial states before the approach detection. That is, the drawing unit 34 is activated to lower the extension members 36b and 36a of the operating pieces 36 in turn so as to change over from the state in FIG. 7B to the state in FIG. 7A. Thus, the extension members 36b and 36a are stored in the actuators 35 so that the vicinities of the lock portions 21 of the airbag 20 are stored in the casing 25. At the same time, the movement unit 30 is actuated to retract the operating pieces 32 back into the actuators 31. Thus, the front bumper 4 is retracted so that the airbag 20 stored in the casing 25 is covered with the bumper 4 from above, so as to change over from the state in FIG. 6A to the state in FIG. 5.

In such a manner, in the pedestrian protection airbag system M1 according to the first embodiment, the movement unit 30 and the drawing unit 34 of the thrust assist 29 are actuated in response to the approach detection. Thus, prior to the actuation of the inflator 22, the airbag 20 is prepared to thrust out smoothly from the casing 25 as the airbag storage portion. As a result, the airbag 20 can be completely inflated quickly with the inflation gas flowing therein from the inflator 22.

Accordingly, in the pedestrian protection airbag system M1 according to the first embodiment, the thrust assist 29 is actuated before the inflation of the airbag 20 is started. Thus, the airbag 20 is in advance prepared to thrust out smoothly from the casing 25. As a result, the time required since the start of inflation of the airbag 20 and till the completion of the inflation of the airbag 20 can be shortened to the utmost.

Particularly in the first embodiment, the thrust assist 29 includes the movement unit 30 operating to move the cover member 27 covering the casing 25 so as to expose the stored airbag 20 to the outside of the vehicle when the movement unit 30 is actuated. Accordingly, the cover member 27 covering the airbag storage portion moves due to the actuation of the movement unit 30 in response to approach detection so that the stored airbag 20 is exposed to the outside of the vehicle before the inflation gas flows into the airbag 20. Consequently, when the inflation gas then flows into the airbag 20 from the inflator 22 in response to touch detection in which it is anticipated that the vehicle will touch the pedestrian, the airbag 20 can thrust out from the airbag storage portion 25 quickly without interfering with the cover member 27. Thus, the time required since the start of the inflation of the airbag 20 and till the completion of the inflation of the airbag 20 can be shortened to the utmost. In addition, according to such a configuration, the airbag 20 is covered with the cover member 27 before actuation. Accordingly, the exterior design of the vehicle V can be improved even if the airbag 20 is stored in the vehicle V.

Particularly in the first embodiment, the front bumper 4 is used as the cover member 27 for covering the airbag storage portion 25 storing the airbag 20. It is therefore unnecessary to mount another cover member on the vehicle. Without consideration of this point, a door portion that can be opened by the movement unit 30 may be provided in a portion of the front bumper 4 itself above the casing 25, that is, in the upper wall portion 4a.

In addition, according to the first embodiment, the thrust assist 29 includes the drawing unit 34 operating to draw out the vicinities of the lock portions 21 from the airbag storage portion 25 when the drawing unit 34 is actuated. The lock portions 21 are parts of the stored airbag 20. Accordingly, the vicinities of the lock portions 21 of the airbag 20 are drawn out from the airbag storage portion 25 due to the actuation of the drawing unit 34 in response to the approach detection before the inflation gas flows into the airbag 20. Consequently, when the inflation gas then flows into the airbag 20 from the inflator 22, the airbag 20 can thrust out easily from the airbag storage portion 25. Thus, the time required since the start of the inflation of the airbag 20 and till the completion of the inflation of the airbag 20 can be shortened to the utmost.

Further, according to the first embodiment, the thrust assist 29 includes both the movement unit 30 and the drawing unit 34. Accordingly, the time required since the start of the inflation of the airbag 20 and till the completion of the inflation of the airbag 20 can be made shorter than in the case where the thrust assist 29 is constituted by the movement unit 30 or the drawing unit 34 alone.

Furthermore, as shown in FIG. 7B, the drawing unit 34 according to the first embodiment is designed to draw out the vicinities of the lock portions 21 of the airbag 20 clear of areas in front of the head lamps 7 and 7 of the vehicle V when the drawing unit 34 is actuated. Accordingly, there is no fear that any head lamp 7, 7 is covered with the airbag 20 even if the drawing unit 34 is actuated during motion with the head lamps 7 and 7 lighted at night or the like. Thus, forward visibility can be secured.

Incidentally, although the head lamps 7 and 7 are not covered with the airbag 20 in the first embodiment even after the airbag 20 is completely inflated, the airbag 20 may be designed to cover the head lamps 7 and 7 after the start of inflation in accordance with the vehicle.

Further, according to the first embodiment, when touch detection is not obtained even after approach detection, the thrust assist 29 is actuated by the control unit 17 so as to restore any portion of the thrust assist 29 actuated in response to the approach detection to its initial state before the actuation. Accordingly, when touch detection is not obtained even after approach detection, the thrust assist 29 automatically recovers its initial state before actuation. Thus, the system M1 according to the first embodiment can be made to stand by until the next anticipation that the vehicle will touch a pedestrian. As a result, it is economical that various members do not have to be exchanged. Not to say, a driver or the like does not have to make any effort to restore members actuated in response to approach detection. Thus, a burden on the driver or the like can be eliminated.

Figure 13:
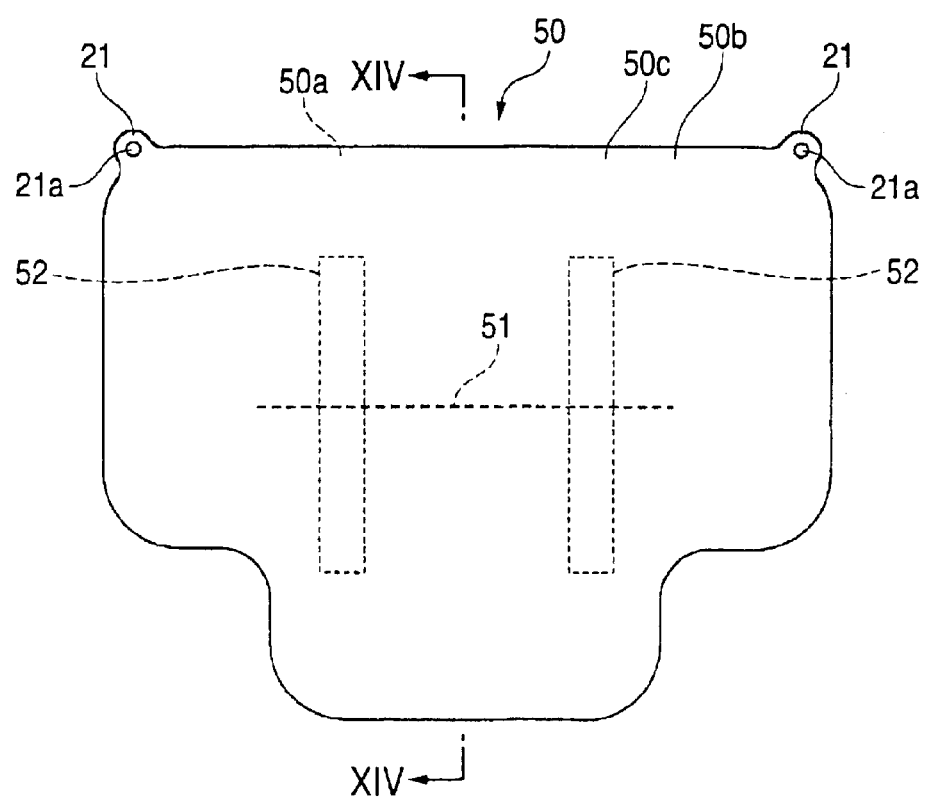
FIG. 13 is a front view showing the state where another airbag is completely inflated.

Incidentally, the airbag 20 according to the first embodiment is draped to form a curved shape following the area ranging from the vicinity of the front grille 5 to the front-portion-side top surface of the hood panel 9. However, in the airbag, such a curved shape may be formed by two-dimensional stitches as in an airbag 50 shown in FIGS. 13 and 14. In this airbag 50, the outer circumferential edges of two sheets of cloth, that is, a vehicle-exterior-side wall portion 50*a* and a pedestrian-side wall portion 50*b* having substantially the same shape as each other are mated to each other so as to form a bag-like shape. In addition, external tethers 52 and 52 are provided, and the up/down-direction opposite ends of each tether 52 are connected with the vehicle-exterior-side wall portion 50*a* so as to provide tucks therein. Thus, a curved shape is formed. Further, an internal tether 51 connecting the wall portions 50*a* and 50*b* with each other is provided inside the airbag 50 so as to make the airbag 50 have a fixed thickness.

Figure 15:
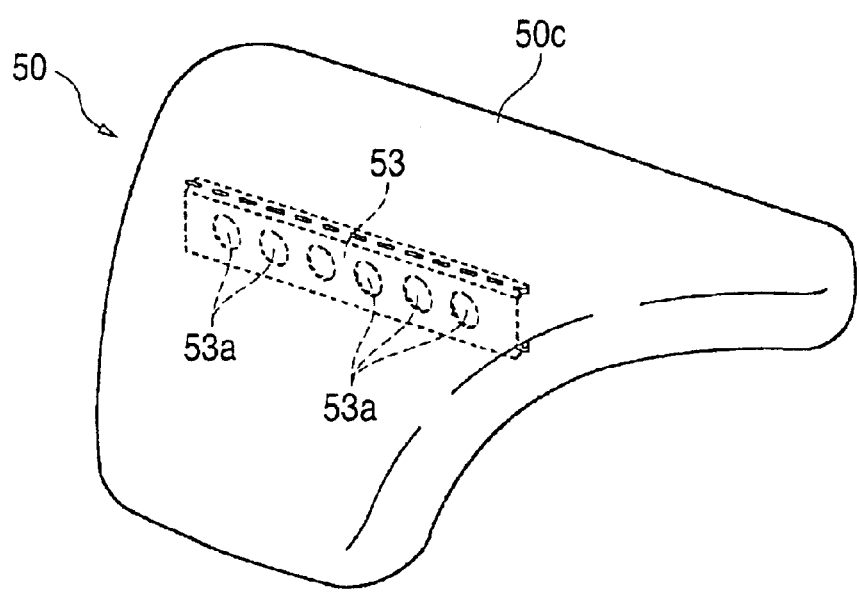
FIG. 15 is a perspective view showing the state where further another airbag is completely inflated.

When an internal tether is provided inside the airbag 50 in order to make the airbag 50 have a fixed thickness, a plurality of gas circulation holes 53*a* may be provided as in an internal tether 53 shown in FIG. 15, so as to make the inflation gas flow smoothly from the inflator 22 toward an upper end 50*c* on the distal side.

Figure 14:
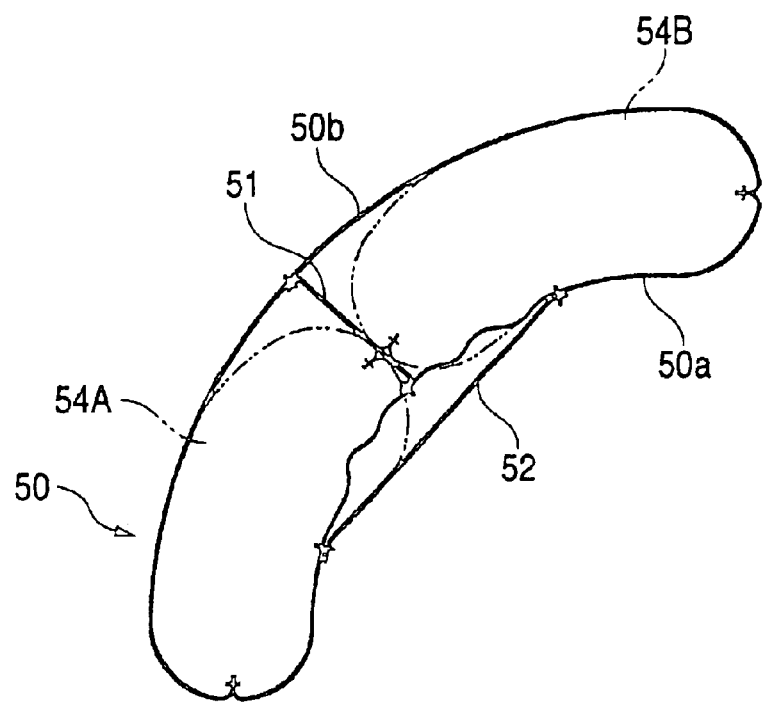
FIG. 14 is a longitudinal sectional view taken on line XIV—XIV in FIG. 13.

Further, when the external tethers 52 are used, a plurality of airbags (inflation portions) 54A and 54B may be used as shown by the chain double-dashed line in FIG. 14. In this case, the airbags 54A and 54B are connected on their vehicle body side through the external tethers 52 so that the airbag 50 can keep the curved shape following the vehicle body.

Figure 17:
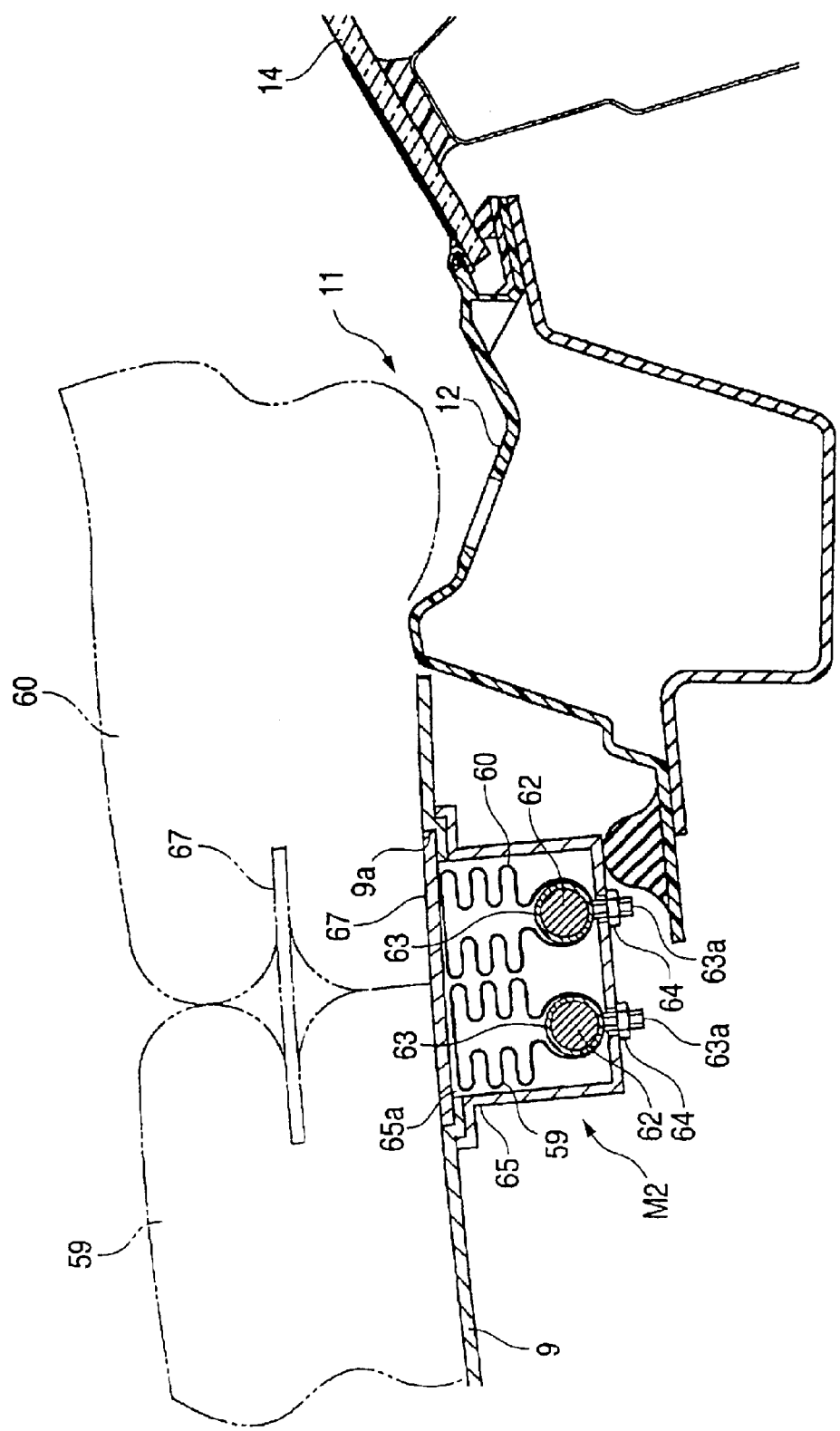
FIG. 17 is a schematic and longitudinal sectional view taken on line XVII—XVII in FIG. 2, showing the pedestrian protection airbag system according to the second embodiment.

The pedestrian protection airbag system M2 according to the second embodiment includes airbags 59 and 60, inflators 62 and 62, a casing 65, the control unit 17, and a thrust assist 69 as shown in FIGS. 1, 2, 17 and 18 and FIGS. 19A and 19B. The airbags 59 and 60 are stored in the hood panel 9 near the cowl 11 of the vehicle V. The inflators 62 and 62 supply inflation gas to the airbags 59 and 60 respectively. The casing 65 stores the airbags 59 and 60 and the inflators 62 and 62. The control unit 17 supplies operating signals to the inflators 62 and 62. The thrust assist 69 is provided for making the airbags 59 and 60 thrust out smoothly from the casing 65 as the airbag storage portion. Incidentally, the reference numeral 12 in FIG. 17 represents a cowl panel.

The casing 65 is made of metal such as sheet metal, and formed into a substantially rectangular parallelepiped box-like shape having a substantially U-shape in section with an open top. The casing 65 is fixed to the circumferential edge of an opening 9*a* formed near the rear end of the hood panel 9.

Incidentally, the rear-end-side opening 9*a* of the hood panel 9 is bent so that the vicinities of its left/right-direction center are placed in front, and the opening 9*a* looks upward. Then, the opening 9*a* is closed by a cover member 67 flush with the top surface of the hood panel 9.

As shown in FIGS. 1, 2 and 11, the airbag 59 is formed into a rectangular plate-like shape, which can cover the rear portion of the hood panel 9 near the front side of the opening 9*a* when the airbag 59 is completely inflated. On the other hand, the airbag 60 includes a body portion 60*a* and pillar cover portions 60*b* as shown in FIGS. 1, 2 and 11. The body portion 60*a* will cover the area ranging from the vicinity of the rear-end top surface of the hood panel 9 near the rear side of the opening 9*a* to the vicinity of the lower-portion front surface of the front wind shield 14 when the airbag 60 is completely inflated. The pillar cover portions 60*b* can cover the front surfaces of the left and right front pillars 15 and 15 likewise. These airbags 59 and 60 are formed by draping woven cloth plain-woven from synthetic fiber such as polyamide fiber or polyester fiber, and combining the draped woven cloth into a three-dimensional bag-like shape by stitching, bonding or the like in the same manner as the airbag 20. Alternatively, each airbag may be formed by providing a predetermined internal tether and combining two sheets of woven cloth, which will be on the vehicle body side and on the pedestrian side, by means of stitching or the like.

Incidentally, the airbags 59 and 60 are designed to cover the top surface of the cover member 67 as shown by the chain double-dashed line in FIG. 17 when the airbags 59 and 60 are completely inflated.

Figure 20:
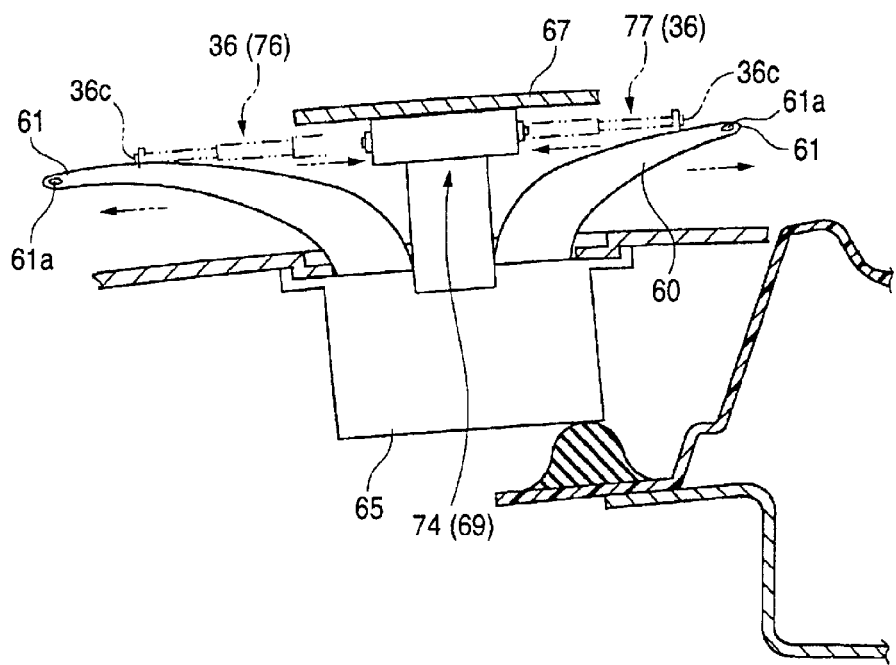
FIG. 20 is a schematic side view showing the state where airbags are released from the drawing unit in the pedestrian protection airbag system according to the second embodiment.

In addition, as shown in FIG. 20, each airbag 59, 60 includes lock portions 61. The lock portions 61 have lock holes 61*a* respectively detachably locked in lock portions 36*c* and 36*c* at the tips of operating pieces 76 and 77 in a drawing unit 74 which will be described later. In the same manner as the airbag 20, these airbags 59 and 60 are folded and stored in the casing 65 while having the inflators 62 stored inside as shown in FIG. 17. Then, when the airbags 59 and 60 are stored together in the casing 65, the lock portions 61 are thrust out to the opposite, left and right sides of the casing 65 so as to be locked in the lock portions 36*c* of the drawing unit 74 respectively.

In the same manner as the inflator 22, actuation of each inflator 62 is controlled by the control unit 17, and the inflator 62 is formed into a columnar shape having gas discharge ports (not shown), and retained by a plurality of toroidal mounting brackets 63 each having a bolt 63a projecting thereon. These inflators 62 are fixed to the casing 65 together with the airbags 59 and 60 by making the bolts 63a of the brackets 63 penetrate the casing 65 and fixing the bolts 63a with nuts 64 respectively.

In the second embodiment, the thrust assist 69 includes the movement unit 70 and the drawing unit 74, the actuation of each of which is controlled by the control unit 17. When the movement unit 70 is actuated, the movement unit 70 operates to move the cover member 67 covering the airbag storage portion storing the airbags 59 and 60, so as to expose the stored airbags 59 and 60 to the outside of the vehicle. When the drawing unit 74 is actuated, the drawing unit 74 operates to draw out parts of the stored airbags 59 and 60 from the airbag storage portion.

The movement unit 70 according to the second embodiment is constituted by two actuators 71 and 71 disposed near the opposite, left and right sides of the casing 65 as shown in FIGS. 2 and 18. The actuators 71 are provided to be retained by brackets 68 and 68 fixed to the bottom surface near the opposite, left and right edges of the opening 9a of the hood panel 9, respectively. Each actuator 71 is designed to move the corresponding operating piece 72 both forward and backward in the up/down direction. The upper ends of the operating pieces 72 are fixed to the lower surface of the cover member 67 near the opposite, left and right ends of the cover member 67. Thus, when the respective operating pieces 72 move up, the cover member 67 covering the folded and stored airbags 59 and 60 from above also moves up so that the airbags 59 and 60 stored in the casing 65 are exposed from above to the outside of the vehicle.

Incidentally, the movement unit may be designed as follows. That is, the cover member 67 is disposed with a hinge at the front or rear circumferential edge of the opening 9a of the hood panel 9. When the movement unit is actuated, the movement unit rotates and moves the cover member 67 in the front/rear direction so as to open the opening 9a.

Examples of the actuators 71 may include electric motors, hydraulic motors, electromagnetic solenoids, etc., if they can move the cover member 67 both up and down in the up/down direction in the same manner as the actuators 31 according to the first embodiment. It is necessary to move the cover member 67 more quickly when moving the cover member 67 up to thereby expose the airbags 59 and 60 to the outside of the vehicle than when moving the cover member 67 down to return the cover member 67 to its initial position after once moving the cover member 67 up. To this end, it is desired that spring force using compressed springs is used for moving up the operating pieces 72, while the operating pieces 72 are moved down with the springs being compressed when the operating pieces 72 are returned to their initial positions.

Figure 19A:
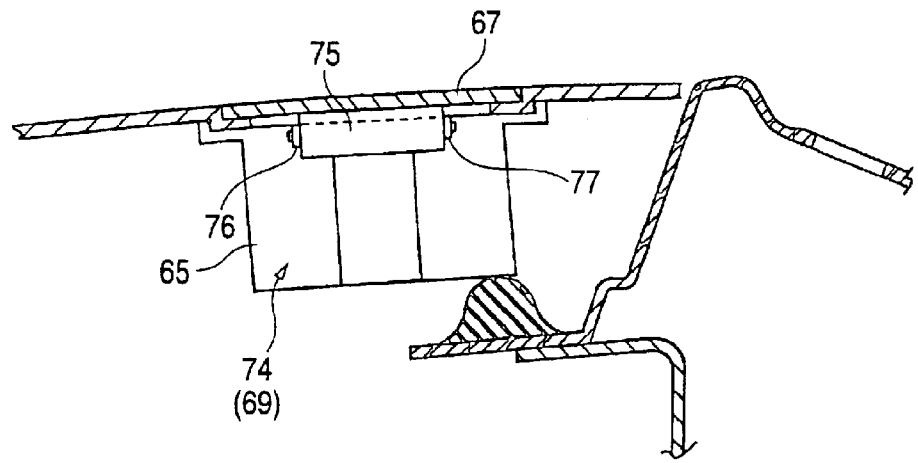
FIGS. 19A and 19B are schematic side views taken on line XIX—XIX in FIG. 2, showing the actuation of a drawing unit in the pedestrian protection airbag system according to the second embodiment.
Figure 19B:
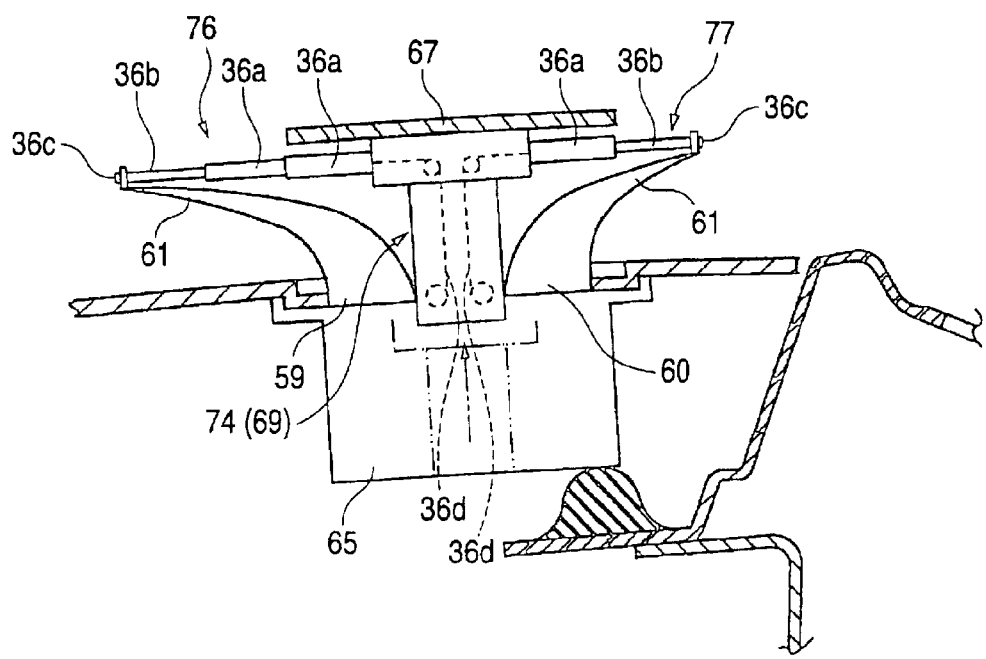

The drawing unit 74 is constituted by two actuators 75 and 75 disposed respectively near the opposite, left and right sides of the casing 65 and between the casing 65 and each actuator 71 of the movement unit 70 as shown in FIG. 2 and FIGS. 19A and 19B. The actuators 75 are fixed to the lower surface of the cover member 67 near the opposite, left and right ends of the cover member 67. Each actuator 75 has operating pieces 76 and 77. The operating piece 76 is recoverably paid out forward, while the operating piece 77 is recoverably paid out backward. Each operating piece 76, 77 has one or plural extension members 36a and 36b in the same manner as the operating piece 36 in the first embodiment. Each actuator 75 operates as follows. That is, a core member 36d made of a bendable, belt-like metal tape, or the like, disposed inside the actuator 75 is coupled with the tip of the extension member 36b. The core member 36d is paid out to thrust out the extension members 36a and 36b of the operating piece 76, 77 from the actuator 75. After that, when the core member 36d is taken up, the extension members 36b and 36a are in turn stored in the actuator 75. In addition, a projection (lock portion) 36c is formed at the tip of each extension member 36b. The projection 36c is detachably inserted into the lock hole 61a in a part (lock portion) 61 of the airbag 59, 60 so as to lock the lock portion 61.

Incidentally, as for the drawing unit in the second embodiment, a drawing unit 39 using rotary arms 41 or a drawing unit 43 using link pieces 46 and 47 may be used as shown in FIGS. 8A and 8B or FIGS. 9A and 9B.

Examples of the actuators 75 of the drawing unit 74 may also include electric motors, hydraulic motors, etc. In the same manner as the actuators 35 in the first embodiment, however, it is necessary for the actuators 75 to move the lock portions 61 of the airbags 59 and 60 more quickly when moving the lock portions 61 of the airbags 59 and 60 for thrusting the lock portions 61 of the airbags 59 and 60 out in the front/rear direction to thereby draw the lock portions 61 of the airbags 59 and 60 out than when moving the lock portions 61 of the airbags 59 and 60 for returning the lock portions 61 of the airbags 59 and 60 to their initial positions after once drawing the lock portions 61 of the airbags 59 and 60 out. To this end, it is desired that spring force using compressed springs is used for paying out the core members 36d, while the operating pieces 76 and 77 are drawn back with the springs being compressed when the lock portions 61 are returned to their initial positions.

The operation of the pedestrian protection airbag system M2 according to the second embodiment will be described. When a pedestrian approaches the running vehicle V, the control unit 17 receiving signals from the sensors 18 will detect the pedestrian approaching the vehicle (approach detection), and actuate the thrust assist 29. When the control unit 17 further detects calculated touch to the pedestrian (touch detection), the control unit 17 will actuate the inflators 62 and 62 so as to supply inflation gas to the airbags 59 and 60 respectively.

Figure 10:
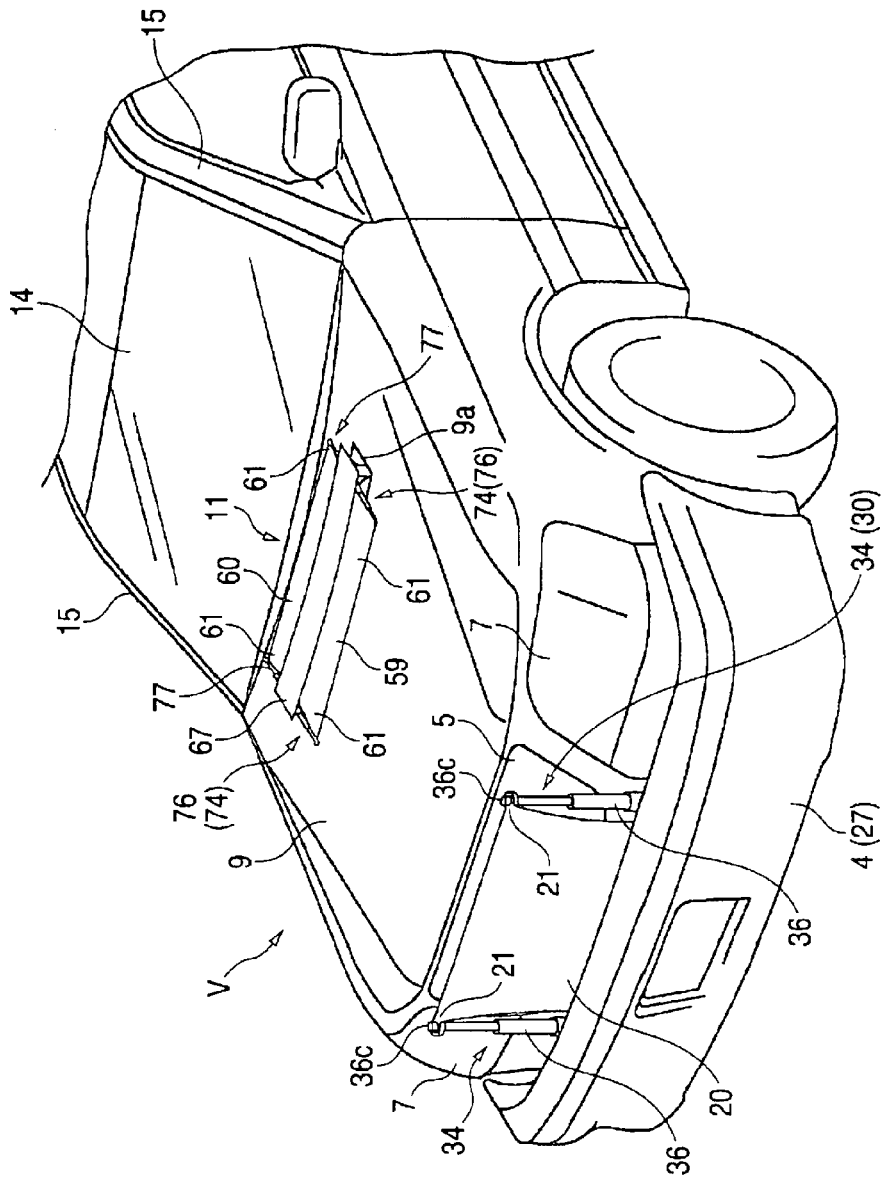
FIG. 10 is a perspective view of the drawing unit according to the first or second embodiment when the drawing unit is actuated.

On the actuation of the thrust assist 69 in response to the approach detection, first, the movement unit 70 is actuated so that the operating pieces 72 of the respective actuators 71 thrust out upward as shown by the chain double-dashed line in FIG. 18, with the result that the cover member 67 is moved upward. Thus, the opening 9a of the hood panel 9 is opened so that the airbags 59 and 60 stored in the casing 65 are exposed from above to the outside of the vehicle. In addition, the drawing unit 74 is actuated so that the extension members 36a and 36b in the operating pieces 76 and 77 of the respective actuators 75 are paid out in turn away from the cover member 67 to the front/rear-direction opposite sides as shown in FIGS. 10 and 19B. Thus, the lock portions 61 of the airbags 59 and 60 are drawn to the opposite, front and rear sides so that the airbags 59 and 60 are drawn out from the inside of the casing 65 to the opposite, front and rear sides.

After that, when the detection stage changes over to the touch detection, the inflators 62 and 62 are actuated so that the inflation gas flows into the airbags 59 and 60. Thus, the airbags 59 and 60 are inflated while the lock portions 61 are released from lock in the lock portions 36c of the extension members 36b, as shown in FIG. 20. Further, as shown in FIG. 11, the airbags 59 and 60 are completely inflated to cover the area ranging from the vicinity of the rear-portion top surface of the hood panel 9 of the vehicle V to the vicinity of the lower-portion front surface of the front wind shield 14 of the vehicle V. Thus, the airbags 59 and 60 can surely protect the pedestrian who is going to touch the vicinity of the cowl 11 of the vehicle V. Further, since the airbag 60 has the pillar cover portions 60b capable of covering the front surfaces of the left and right front pillars 15 of the vehicle V, any pedestrian who is going to touch any front pillar 15 can be also protected surely. Incidentally, when the inflators 62 and 62 are actuated, the drawing unit 74 is operated by the control unit 17 so that the drawing unit 74 returns the extension members 36a and 36b back into the actuators 75 respectively to thereby prevent the extension members 36a and 36b from interfering with the airbags 59 and 60 which are being inflated.

When the control unit 17 does not reach the touch detection based on signals from the sensors 18 after the approach detection and therefore determines that the vehicle V will not touch the pedestrian based on the distance between the pedestrian and the vehicle V and the vehicle speed, the control unit 17 controls the actuation of the drawing unit 74 and the movement unit 70 of the thrust assist 69 so as to restore the airbags 59 and 60 and the units 74 and 70 to their initial states before the approach detection. That is, the drawing unit 74 is actuated to retract the extension members 36b and 36a of the operating pieces 76 and 77 in turn so as to change over from the state in FIG. 19B to the state in FIG. 19A. Thus, the extension members 36b and 36a are stored in the actuators 75 so that the vicinities of the lock portions 61 of the airbags 59 and 60 are stored in the casing 65. At the same time, the movement unit 70 is actuated to retract the operating pieces 72 back into the actuators 71. Thus, the cover member 67 is moved down so that the airbags 59 and 60 stored in the casing 65 are covered with the cover member 67 from above, so as to change over from the state in FIG. 19B to the state in FIG. 19A (so as to change over from the state shown by the chain double-dashed line in FIG. 18 to the state shown by the solid line in FIG. 18).

In such a manner, also in the pedestrian protection airbag system M2 according to the second embodiment, the movement unit 70 and the drawing unit 74 of the thrust assist 69 are actuated in response to the approach detection. Thus, prior to the actuation of the inflators 62 and 62, the airbags 59 and 60 are prepared to thrust out smoothly from the casing 65 as the airbag storage portion. As a result, the airbags 59 and 60 can be completely inflated quickly with the inflation gas flowing therein from the inflators 62 and 62.

Accordingly, also in the pedestrian protection airbag system M2 according to the second embodiment, the thrust assist 69 is actuated before the start of inflation of the airbags 59 and 60. Thus, the airbags 59 and 60 are in advance prepared to thrust out smoothly from the casing 65. As a result, the time required since the start of inflation of the airbags 59 and 60 and till the completion of the inflation of the airbags 59 and 60 can be shortened to the utmost.

Also in the second embodiment, the thrust assist 69 includes the movement unit 70 operating to move the cover member 67 covering the casing 65 as the airbag storage portion storing the airbags 59 and 60 so as to expose the stored airbags 59 and 60 to the outside of the vehicle when the movement unit 70 is actuated. Accordingly, when the inflation gas flows into the airbags 59 and 60 from the inflators 62 in response to touch detection, the airbags 59 and 60 can thrust out from the airbag storage portion 65 quickly without unnecessarily interfering with the cover member 67. Thus, the time required since the start of the inflation of the airbags 59 and 60 and till the completion of the inflation of the airbags 59 and 60 can be shortened to the utmost. Further, according to such a configuration, the airbags 59 and 60 are covered with the cover member 67 before actuation in the same manner as in the first embodiment. Accordingly, the exterior design of the vehicle V can be improved even if the airbags 59 and 60 are stored in the vehicle V.

Also in the second embodiment, the thrust assist 69 includes the drawing unit 74 capable of drawing out parts of the stored airbags 59 and 60 from the airbag storage portion 65 when the drawing unit 74 is actuated. The drawing unit 74 is designed to draw out the circumferential edges of the lock portions 61 of the stored airbags 59 and 60 substantially in the front/rear direction of the vehicle V from the opening 9a of the hood panel 9 opened due to the movement of the cover member 67 caused by the actuation of the movement unit 70. Thus, the time required since the start of inflation of the airbags 59 and 60 and till the completion of the inflation of the airbags 59 and 60 to cover the vicinities of the cowl 11 of the vehicle V can be made shorter.

Further, also according to the second embodiment, when touch detection is not obtained even after approach detection, the thrust assist 69 is actuated by the control unit 17 so as to restore any portion of the thrust assist 69 actuated in response to the approach detection to its initial state before the actuation. Accordingly, when touch detection is not obtained even after approach detection, the thrust assist 69 automatically restores its initial state before actuation. Thus, similar effect to that of the first embodiment can be obtained.

Figure 21:
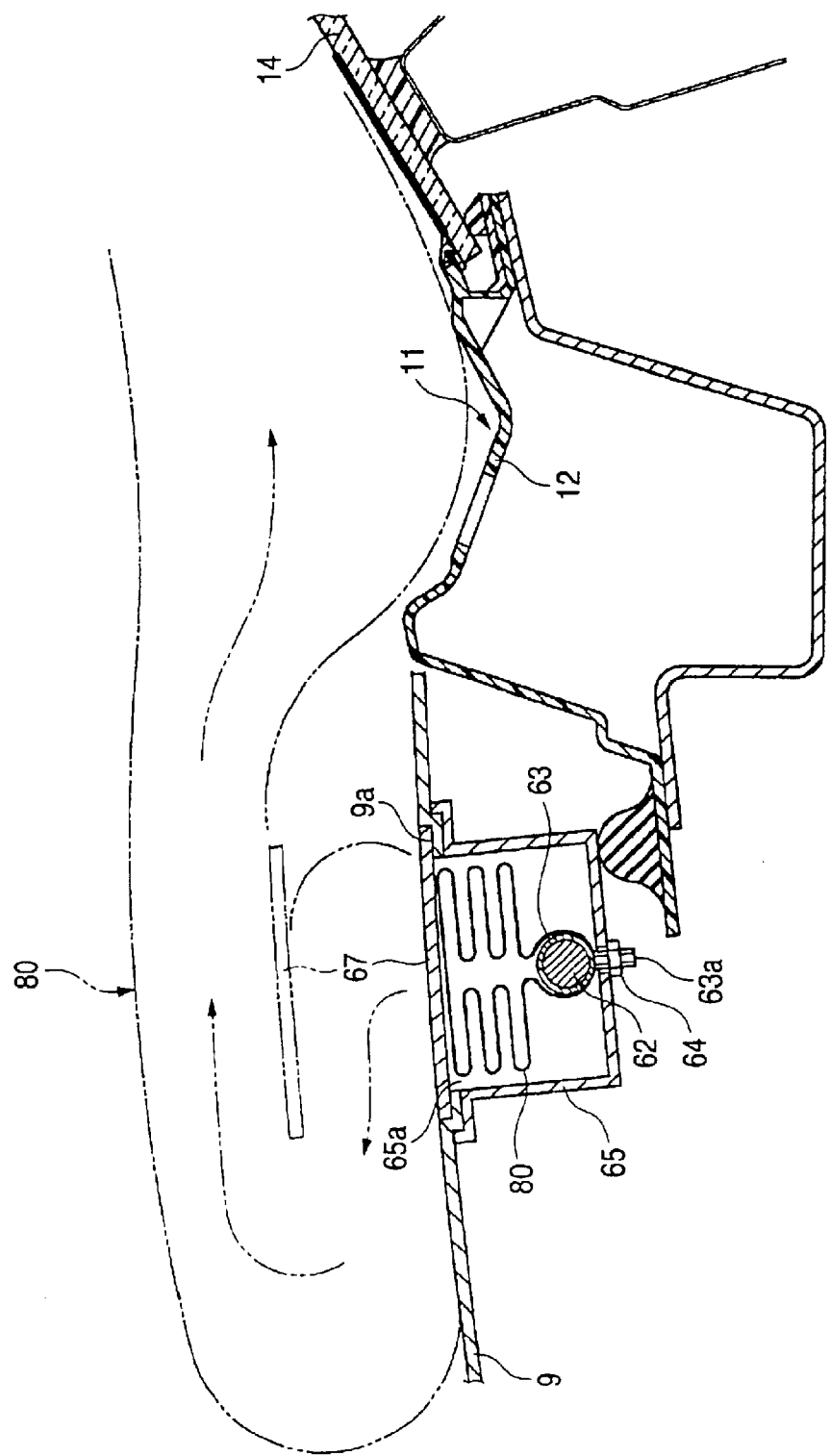
FIG. 21 is a view showing a modification of an airbag in the second embodiment.
Figure 22:
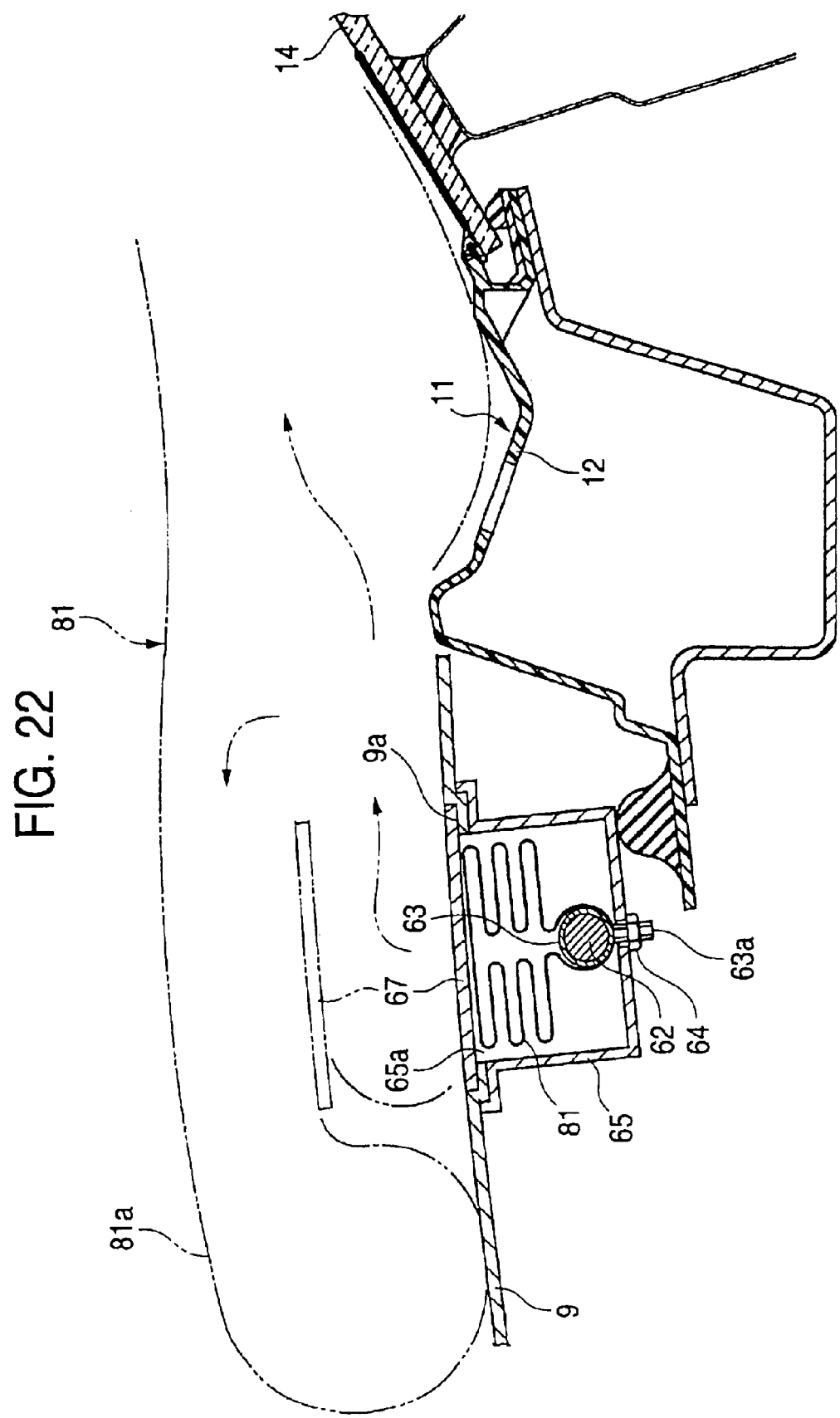
FIG. 22 is a view showing another modification of an airbag in the second embodiment.

The two airbags S9 and 60 are used as airbags for covering the vicinities of the cowl 11 in the second embodiment. However, the area ranging from the rear-portion-side top surface of the hood panel 9 to the lower-portion front surface of the wind shield 14, including the front sides of the front pillars 15, may be covered with one airbag 80 or 81, as shown in FIG. 21 or 22, when the airbag 80 or 81 is completely inflated.

In this case, in order to protect a pedestrian, it is desired that the area including the top surface of the cover member 67 with the opening 9a open is covered. To that end, it is desired that the airbag 80 is unfolded and inflated to the rear side of the vehicle V after thrusting out forward from the casing 65 as shown in FIG. 21. Alternatively, it is desired that a portion 81a of the airbag 81 is unfolded and inflated to the front side of the vehicle V after thrusting out backward from the casing 65 as shown in FIG. 22. Incidentally, in the case of the airbag 80 shown in FIG. 21, such an unfolded and inflated configuration of the airbag 80 can be established easily if the drawing unit 74 is designed to draw out the airbag 80 forward from the casing 65. On the other hand, in the case of the airbag 81 shown in FIG. 22, such an unfolded and inflated configuration of the airbag 81 can be established easily if the drawing unit 74 is designed to draw out the airbag 81 backward from the casing 65.

Figure 23:
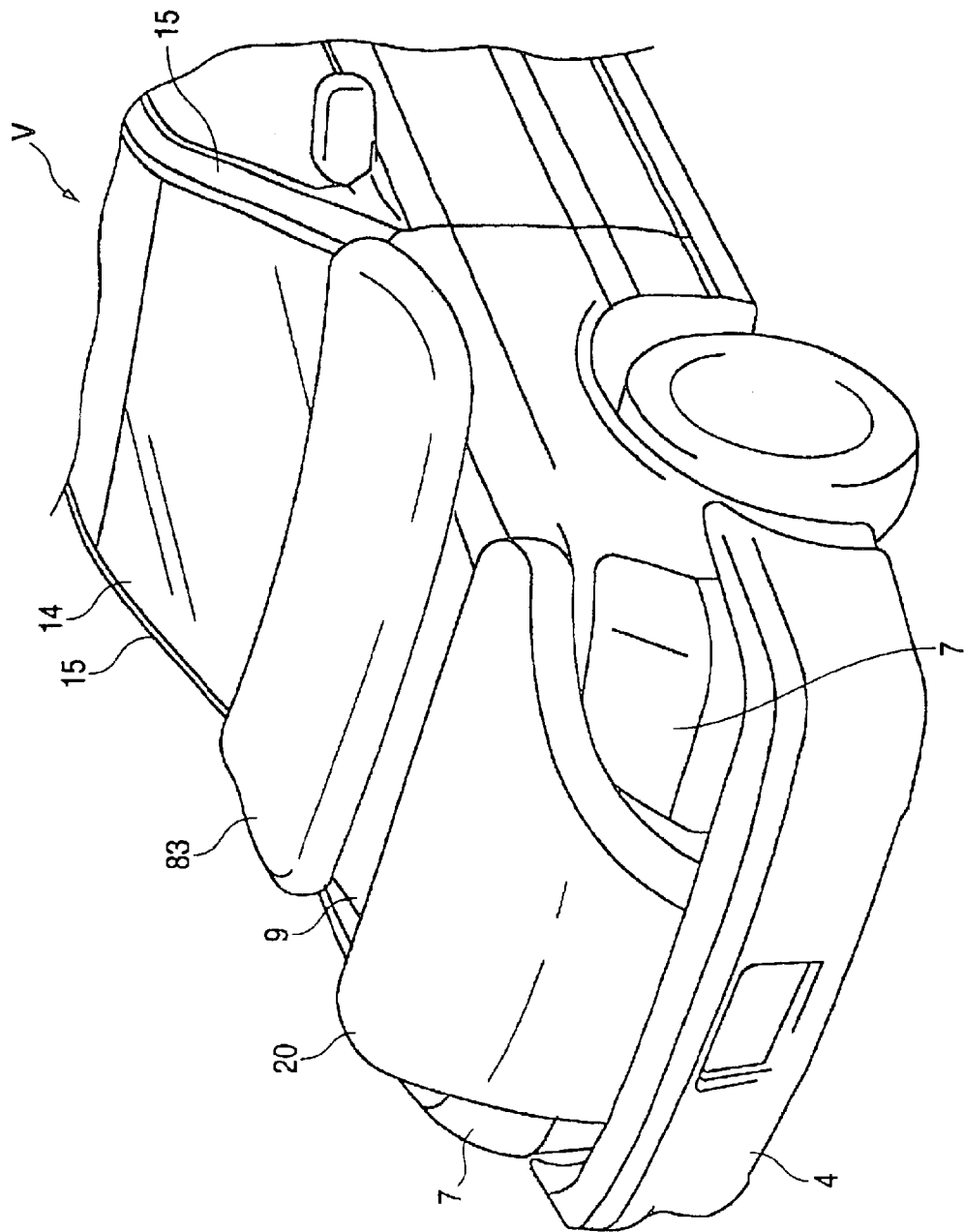
FIG. 23 is a view showing another modification of an airbag in the second embodiment.

Incidentally, the airbag for covering the vicinities of the cowl 11 may not cover the upper-portion-side front surfaces of the front pillars 15 but cover only the lower-portion-side front surfaces of the pillars 15 as an airbag 83 shown in FIG. 23.

Figure 16:
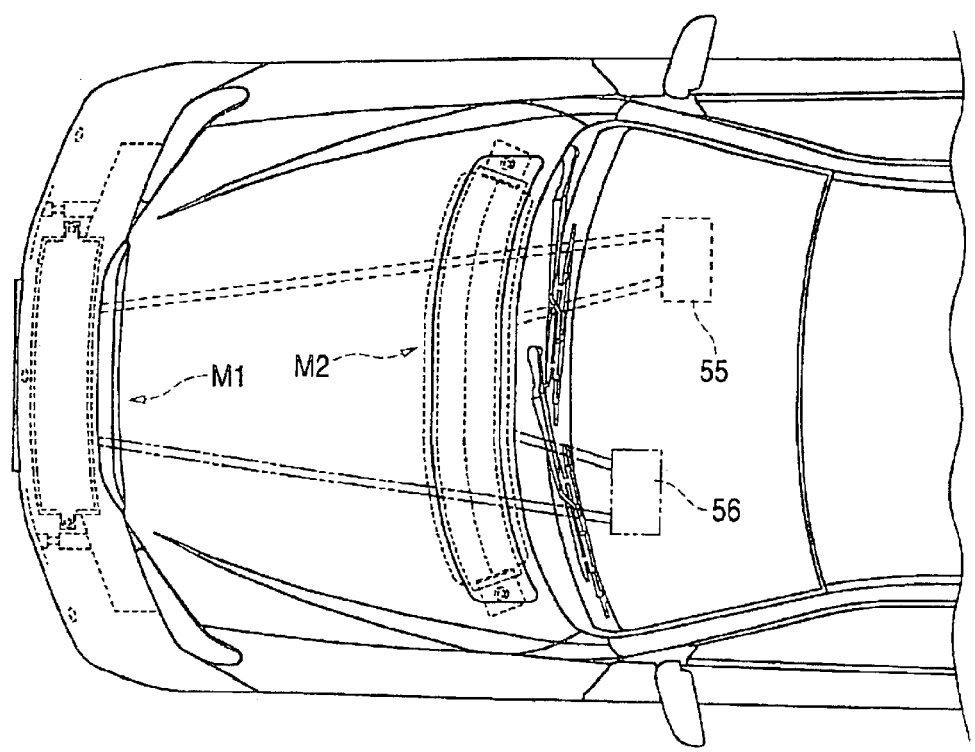
FIG. 16 is a view showing modifications of inflators.

In addition, the first and second embodiments have shown the case where the inflators 22 and 62 for inflating the airbags 20, 59 and 60 are stored in the airbags 20, 59 and 60, and then stored in the casing 25 and 65 together with the airbags 20, 59 and 60 respectively. However, an inflator 55 for a driver's airbag system may be used to supply inflation gas from the inflator 55 to the airbag 20, 59, 60 as shown by the broken line in FIG. 16. Alternatively, an inflator 56 for an assistant driver's airbag system may be used to supply inflation gas from the inflator 56 to the airbag 20, 59, 60 as shown by the chain double-dashed line in FIG. 16. Furthermore, when an inflator is shared between a driver's airbag system and an assistant driver's airbag system, inflation gas from the inflator may be used for the airbag 20, 59, 60.

What is claimed is:

1. A pedestrian protection airbag system mounted on a vehicle comprising:

a control unit which receives signals from a sensor capable of detecting a pedestrian;

an airbag for thrusting out from an airbag storage portion by inflation so as to deploy between said pedestrian and said vehicle;

an inflator for supplying inflation gas to said airbag; and a thrust assist for facilitating said airbag to thrust out from said airbag storage portion;

wherein said control unit receives the signal from said sensor to perform a touch detection in which said control unit anticipates that said vehicle will touch said pedestrian, and an approach detection in which said control unit detects said pedestrian approaching said vehicle;

wherein said control unit actuates said thrust assist when the approach detection is performed; and said control unit actuates said inflator when the touch detection is performed.

2. A pedestrian protection airbag system according to claim 1, wherein said thrust assist includes a movement unit operating to move a cover member covering said airbag storage portion so as to expose said stored airbag to outside of said vehicle when said movement unit is actuated.

3. A pedestrian protection airbag system according to claim 2, wherein said airbag is stored in a front bumper of said vehicle; and said thrust assist is designed so that:

said cover member covering said stored airbag is designed as a front bumper of said vehicle; and said movement unit moves said front bumper so as to expose said stored airbag from above when said movement unit is actuated.

4. A pedestrian protection airbag system according to claim 2, wherein:

said airbag is stored near a rear end of a hood panel of said vehicle; and said thrust assist is designed so that:

said cover member is disposed above said airbag storage portion and on a rear-end-side top surface of said hood panel; and said movement unit moves said cover member upward so as to expose said stored airbag from above when said movement unit is actuated.

5. A pedestrian protection airbag system according to claim 4, wherein:

said thrust assist has a drawing unit capable of drawing out at least a part of said stored airbag from said airbag storage portion when said drawing unit is actuated; and said drawing unit is designed to draw out at least a part of said stored airbag substantially in a front/rear direction of said vehicle and from an opening formed due to movement of said cover member caused by actuation of said movement unit.

6. A pedestrian protection airbag system according to claim 1, wherein said thrust assist includes a drawing unit operating to draw out at least a part of said stored airbag from said airbag storage portion when said drawing unit is actuated.

7. A pedestrian protection airbag system according to claim 6, wherein said airbag is stored in a front bumper of said vehicle; and said drawing unit of said thrust assist draws out at least a part of said stored airbag toward a front surface of a front grille of said vehicle when said drawing unit is actuated.

8. A pedestrian protection airbag system according to claim 7, wherein said drawing unit draws out at least a part of said airbag clear of an area in front of each head lamp of said vehicle when said drawing unit is actuated.

9. A pedestrian protection airbag system according to claim 1, wherein any portion of said thrust assist actuated after said approach detection is actuated by the control unit so as to be restored to an unactuated state when said touch detection is not obtained even after said approach detection.

10. A pedestrian protection airbag system according to claim 1, wherein said airbag is stored on a front portion side of said vehicle so that said airbag can cover at least an area ranging from a front surface of said vehicle near a front grille thereof to a front-portion-side top surface of a hood panel of said vehicle when said airbag is completely inflated.

11. A pedestrian protection airbag system according to claim 1, wherein said airbag is stored in a vicinity of a cowl of said vehicle so that said airbag covers at least an area ranging from a rear-portion-side top surface of a hood panel of said vehicle to a lower-portion front surface of a wind shield of said vehicle when said airbag is completely inflated.

12. A pedestrian protection airbag system according to claim 11, wherein said airbag has a pillar cover portion capable of covering a front surface side of a front pillar of said vehicle.

* * * * *